ized by

(12) United States Patent
Behrooz et al.

(10) Patent No.: US 11,354,804 B1
(45) Date of Patent: Jun. 7, 2022

(54) TRANSFORMING MULTISPECTRAL IMAGES TO ENHANCED RESOLUTION IMAGES ENABLED BY MACHINE LEARNING

(71) Applicant: Verily Life Sciences LLC, South San Francisco, CA (US)

(72) Inventors: Ali Behrooz, San Mateo, CA (US); Cheng-Hsun Wu, San Bruno, CA (US)

(73) Assignee: VERILY LIFE SCIENCES LLC, South San Francisco, CA (US)

( * ) Notice: Subject to any disclaimer, the term of this patent is extended or adjusted under 35 U.S.C. 154(b) by 241 days.

(21) Appl. No.: 16/586,205

(22) Filed: Sep. 27, 2019

(51) Int. Cl.
| | |
|---|---|
| *G06T 7/00* | (2017.01) |
| *G06T 3/00* | (2006.01) |
| *G06T 3/40* | (2006.01) |
| *G06N 20/00* | (2019.01) |
| *G06N 3/08* | (2006.01) |

(52) U.S. Cl.
CPC ............ *G06T 7/0014* (2013.01); *G06N 3/08* (2013.01); *G06N 20/00* (2019.01); *G06T 3/0075* (2013.01); *G06T 3/40* (2013.01); *G06T 2207/10036* (2013.01); *G06T 2207/20081* (2013.01); *G06T 2207/20084* (2013.01)

(58) Field of Classification Search
CPC ....... G06T 7/0014; G06T 3/40; G06T 3/0075; G06T 2207/20081; G06T 2207/10036; G06T 2207/20084; G06N 20/00; G06N 3/08
USPC .......................................................... 382/128
See application file for complete search history.

(56) References Cited

U.S. PATENT DOCUMENTS

| 10,824,847 B2 | 11/2020 | Wu et al. |
|---|---|---|
| 2011/0074944 A1 | 3/2011 | Can et al. |
| 2011/0311124 A1 | 12/2011 | Ohnishi |
| (Continued) | | |

FOREIGN PATENT DOCUMENTS

| CN | 102227747 | 10/2011 |
|---|---|---|
| CN | 105027164 | 11/2015 |
| (Continued) | | |

OTHER PUBLICATIONS

European Application No. 18855135.2, Office Action, dated Jun. 8, 2021, 7 pages.

(Continued)

*Primary Examiner* — Jerome Grant, II
(74) *Attorney, Agent, or Firm* — Kilpatrick Townsend & Stockton LLP

(57) ABSTRACT

Systems and methods for predicting images with enhanced spatial resolution using a neural network are provided herein. According to an aspect of the invention, a method includes accessing an input image of a biological sample, wherein the input image includes a first spatial resolution and a plurality of spectral images, and wherein each spectral image of the plurality of spectral images includes data from a different wavelength band at a different spectral channel; applying a trained artificial neural network to the input image; generating an output image at a second spatial resolution, wherein the second spatial resolution is higher than the first spatial resolution, and wherein the output image includes a fewer number of spectral channels than the plurality of spectral images included in the input image; and outputting the output image.

18 Claims, 14 Drawing Sheets

(56) References Cited

U.S. PATENT DOCUMENTS

| | | | |
|---|---|---|---|
| 2014/0221813 | A1 | 8/2014 | Bryant-Greenwood et al. |
| 2014/0270457 | A1 | 9/2014 | Bhargava |
| 2016/0196648 | A1 | 7/2016 | Madabhushi et al. |
| 2016/0252719 | A1 | 9/2016 | Liu et al. |
| 2017/0140533 | A1 | 5/2017 | Nelson et al. |
| 2017/0169567 | A1* | 6/2017 | Chefd'hotel .......... G06T 7/0012 |
| 2017/0343477 | A1 | 11/2017 | Santori et al. |
| 2017/0343784 | A1 | 11/2017 | Wu et al. |
| 2017/0343824 | A1 | 11/2017 | Sinha et al. |
| 2018/0012356 | A1 | 1/2018 | Madabhushi et al. |
| 2018/0365829 | A1 | 12/2018 | Madabhushi et al. |
| 2019/0188446 | A1* | 6/2019 | Wu .................... G06T 3/0075 |
| 2020/0302249 | A1* | 9/2020 | Liu ...................... G06T 7/97 |
| 2020/0334871 | A1* | 10/2020 | Su ...................... A61B 5/7203 |
| 2021/0021949 | A1* | 1/2021 | Sridharan ................ H04S 5/02 |
| 2021/0201017 | A1* | 7/2021 | Wakui .................... G06T 7/11 |
| 2021/0256701 | A1* | 8/2021 | Nozaki ................. G06N 20/00 |
| 2021/0262329 | A1* | 8/2021 | Kaur ................... G01V 99/005 |

FOREIGN PATENT DOCUMENTS

| | | | | |
|---|---|---|---|---|
| WO | 2012148893 | | 11/2012 | |
| WO | WO2012148893 | * | 11/2012 | ............... G06K 9/50 |
| WO | W02020142461 | * | 7/2020 | ............... G06T 7/00 |
| WO | W02021133847 | * | 7/2021 | ............... G06T 1/00 |

OTHER PUBLICATIONS

Christiansen et al., "In Silico Labeling: Predicting Fluorescent Labels in Unlabeled Images", CellPress No. 173, Apr. 19, 2018, pp. 792-803.

Gareau et al., "The Feasibility of Digitally Stained Multimodal Confocal Mosaics to Simulate Histopathology", NIH Public Access Author Manuscript, J Biomed Opt, vol. 14, Issue 3, Aug. 27, 2010, pp. 1-6.

GE Global Research, "Molecular Pathology (MultiOmyx™) Visualizes Cancer", Available Online at: https://www.geglobalresearch.com/blog/molecular-pathology-multiomyx%E2%84%A2-visualizes-cancer, Aug. 14, 2017, 4 pages.

Giacomelli et al., "Virtual Hematoxylin and Eosin Transillumination Microscopy Using Epi-Fluorescence Imaging", PLoS ONE, vol. 11, Issue 8, Aug. 8, 2016, pp. 1-13.

Orringer et al., "Rapid Intraoperative Histology of Unprocessed Surgical Specimens via Fibre-Laser-Based Stimulated Raman Scattering Microscopy", HHS Public Access Author manuscript, Nat Biomed Eng., vol. 1, Sep. 25, 2017, pp. 1-25.

PCT/US2018/065087, "International Search Report and Written Opinion", May 27, 2019, 13 pages.

Rivenson et al., "Deep Learning-Based Virtual Histology Staining Using Autofluorescence of Label-Free Tissue", University of California, Los Angeles, CA, arXiv:1803, vol. 11293, Mar. 30, 2018, 22 pages.

U.S. Appl. No. 16/217,262, Notice of Allowance, dated Jul. 1, 2020, 9 pages.

International Application No. PCT/US2018/065087, International Preliminary Report on Patentability, dated Jun. 25, 2020, 9 pages.

Chinese Application No. 201880077801.4, Office Action, dated Mar. 8, 2021, 16 pages.

Chinese Application No. 201880077801.4, Second Office Action, mailed Nov. 15, 2021, 6 pages.

* cited by examiner

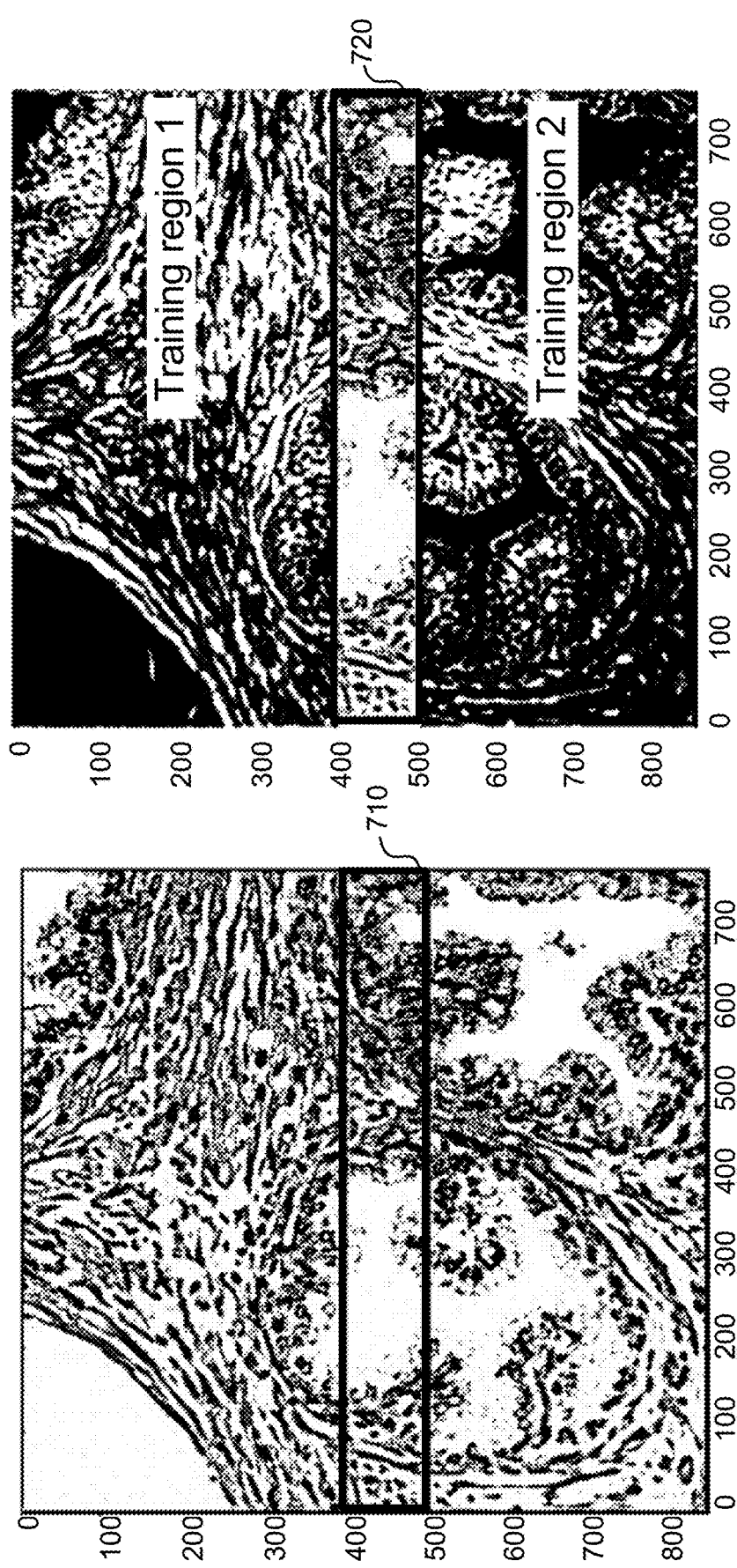

| Channel # | Excitation filter pass band (nm) | Emission filter pass band (nm) |
|---|---|---|
| 1 | 355-385 | 430-500 |
| 2 | 355-385 | 500-550 |
| 3 | 355-385 | 570-650 |
| 4 | 460-490 | 500-550 |
| 5 | 460-490 | 570-650 |
| 6 | 530-560 | 570-650 |
| 7 | 530-560 | 655-705 |

TRANSFORMING MULTISPECTRAL IMAGES TO ENHANCED RESOLUTION IMAGES ENABLED BY MACHINE LEARNING

BACKGROUND OF THE INVENTION

Various stains may be used in histology to study cells and tissues under a microscope. Because biological tissue has little contrast under a microscope, stains are often used to provide contrast and highlight particular features of interest. Stains allow pathologists to image subcellular components and distinguish different cell types and tissue elements. For example, hematoxylin and eosin (H&E) has been a gold standard for diagnosing various diseases for at least a century. Hematoxylin is a dark blue or purple stain that binds to basophilic substances, while eosin is a red or pink stain that binds to acidophilic substances. H&E stains a cell nucleus purple and cytoplasm pink.

In order to prepare a biological sample for analysis, the sample is typically fixed, dehydrated, embedded in paraffin, sectioned, stained, and mounted on a microscope slide. However, this sample preparation can take a day to complete. The staining typically requires 30 minutes for a paraffin-embedded sample and 15 minutes for a frozen sample. This hinders real-time evaluation and immediate feedback in an operating room, where time is critical. Further, the staining does not provide detailed molecular information for further systematic analyses of the tissue, and the staining process can damage biomolecules such as proteins and ribonucleic acids (RNAs).

One method uses two-channel imaging of stimulated Raman scattering microscopy to generate virtual images of H&E staining. However, this method requires a sophisticated laser system that includes pulsed fiber lasers, and is based on a point scanning system that operates at slow speeds. Other methods use various microscopy techniques, such as single-channel epi-fluorescence multiphoton microscopy or single-channel fluorescence confocal microscopy, to generate virtual images of H&E staining. However, these methods require the sample to be stained with different dyes, such as 4',6-diamidino-2-phenylindole (DAPI) or acridine orange.

SUMMARY OF THE INVENTION

Exemplary embodiments of the invention provide systems and methods for generating virtually stained images of unstained samples. According to an aspect of the invention, a computer-implemented method includes accessing an image training dataset that includes a plurality of image pairs. Each image pair of the plurality of image pairs includes a first image of a first tissue sample that is acquired when the first tissue sample is unstained, and a second image of the first tissue sample that is acquired when the first tissue sample is stained. The first image includes a first plurality of spectral images of the first tissue sample. Each spectral image of the first plurality of spectral images includes data from a different wavelength band. The second image includes a plurality of colors that indicate, for each location of a plurality of locations within the second image, an extent to which at least one stain binds to the first tissue sample.

The method also includes accessing a set of parameters for an artificial neural network. The set of parameters includes weights associated with artificial neurons within the artificial neural network. The artificial neural network is trained by using the image training dataset and the set of parameters to adjust the weights. A third image of a second tissue sample that is unstained is accessed. The third image includes a third plurality of spectral images of the second tissue sample, and each spectral image of the third plurality of spectral images includes data from a different wavelength band. The trained artificial neural network is used to generate a virtually stained image of the second tissue sample from the third image, and the virtually stained image is output.

The method may also include, for each of the plurality of image pairs, spatially registering the first image with the second image such that each pixel in the first image is correlated with a respective pixel in the second image that is located at the same spatial coordinates. Spatially registering the first image with the second image may include using an affine transformation by maximizing mutual information.

Training the artificial neural network may include using the first images as features and using the second images as labels. An output layer of the artificial neural network may include three artificial neurons that respectively predict red, blue, and green channels of the virtually stained image. The artificial neural network may be a convolutional neural network, and training the artificial neural network may include identifying points, edges, connective elements, and/or correlations between attributes within the first image and the second image.

The second tissue sample may include a tissue type that is the same as a tissue type of the first tissue sample.

According to another aspect of the invention, a system is provided that includes one or more data processors and a non-transitory computer readable storage medium containing instructions which when executed on the one or more data processors, cause the one or more data processors to perform the actions discussed above. According to yet another aspect of the invention, a computer-program product tangibly embodied in a non-transitory machine-readable storage medium is provided. The computer-program product includes instructions configured to cause one or more data processors to perform the actions discussed above.

Systems and methods for predicting images with enhanced spatial resolution using a neural network are provided herein. An example embodiment of the invention includes a method. The method includes accessing an input image of a biological sample, wherein the input image includes a first spatial resolution and a plurality of spectral images, and wherein each spectral image of the plurality of spectral images includes data from a different wavelength band at a different spectral channel; applying a trained artificial neural network to the input image; generating an output image at a second spatial resolution, wherein the second spatial resolution is higher than the first spatial resolution, and wherein the output image includes a fewer number of spectral channels than the plurality of spectral images included in the input image; and outputting the output image.

According to other aspects of the invention, the biological sample is unstained, and the output image includes features of the biological sample after the biological sample is stained. In other aspects, the method further comprises determining a set of desired features associated with the biological sample; and determining a specific number of spectral images based on the set of desired features, wherein the plurality of spectral images includes the specific number of spectral images. In other aspects, the method further comprises determining a set of desired features associated with the biological sample; and determining a specific number of wavelength bands for each spectral image of the plurality of spectral images based on the set of desired features. In other aspects, the method further comprises training the artificial neural network by: accessing an image training dataset including a plurality of image pairs, wherein each image pair of the plurality of image pairs includes: a first image of the biological sample acquired when the biological sample is unstained, wherein the first image includes a second plurality of spectral images of the biological sample, and wherein each spectral image of the second plurality of spectral images includes data from a different wavelength band; and a second image of the biological sample acquired when the biological sample is stained; and training the artificial neural network using the image training dataset. In other aspects, the method further comprises determining a range of candidate numbers of spectral images to be included in the second plurality of spectral images; determining a difference between the second spatial resolution and the first spatial resolution associated with each of the candidate numbers of spectral images; and determining an optimal number of spectral images based on the difference between the second spatial resolution and the first spatial resolution associated with each of the candidate numbers of spectral images. In other aspects, the first image of the biological sample is down-sampled before training the artificial neural network using the image training dataset, and wherein the down-sampled first image has a spatial resolution lower than the first spatial resolution. In other aspects, the method further comprises, for each of the plurality of image pairs, spatially registering the first image with the second image such that each pixel in the first image is correlated with a respective pixel in the second image that is located at the same spatial coordinates. In other aspects, the artificial neural network is a convolutional neural network. In other aspects, the output image is an RGB image. In other aspects, the output image is a monochrome image. In other aspects, the method further comprises the biological sample is a tissue sample.

Another example embodiment of the invention includes a system comprising: one or more data processors; and a non-transitory computer readable storage medium containing instructions. When executed on the one or more data processors, the instructions cause the one or more data processors to perform actions including: accessing an input image of a biological sample, wherein the input image includes a first spatial resolution and a plurality of spectral images, and wherein each spectral image of the plurality of spectral images includes data from a different wavelength band at a different spectral channel; applying a trained artificial neural network to the input image; generating an output image at a second spatial resolution, wherein the second spatial resolution is higher than the first spatial resolution, and wherein the output image includes a fewer number of spectral channels than the plurality of spectral images included in the input image; and outputting the output image.

According to other aspects of the invention, the biological sample is unstained, and wherein the output image includes features of the biological sample after the biological sample is stained. In other aspects, the instructions further comprise: determining a set of desired features associated with the biological sample; and determining a specific number of spectral images based on the set of desired features, wherein the plurality of spectral images includes the specific number of spectral images. In other aspects, the instructions further comprise: determining a set of desired features associated with the biological sample; and determining a specific number of wavelength bands for each spectral image of the plurality of spectral images based on the set of desired features. In other aspects, the instructions further comprise training the artificial neural network by: accessing an image training dataset including a plurality of image pairs, wherein each image pair of the plurality of image pairs includes: a first image of the biological sample acquired when the biological sample is unstained, wherein the first image includes a second plurality of spectral images of the biological sample, and wherein each spectral image of the second plurality of spectral images includes data from a different wavelength band; and a second image of the biological sample acquired when the biological sample is stained; and training the artificial neural network using the image training dataset. In other aspects, the instructions further comprise: determining a range of candidate numbers of spectral images to be included in the second plurality of spectral images; determining a difference between the second spatial resolution and the first spatial resolution associated with each of the candidate numbers of spectral images; and determining an optimal number of spectral images based on the difference between the second spatial resolution and the first spatial resolution associated with each of the candidate numbers of spectral images. In other aspects, the first image of the biological sample is down-sampled before training the artificial neural network using the image training dataset, and wherein the down-sampled first image has a spatial resolution lower than the first spatial resolution. In other aspects, the instructions further comprise, for each of the plurality of image pairs, spatially registering the first image with the second image such that each pixel in the first image is correlated with a respective pixel in the second image that is located at the same spatial coordinates. In other aspects, the artificial neural network is a convolutional neural network. In other aspects, the output image is an RGB image. In other aspects, the output image is a monochrome image. In other aspects, the method further comprises the biological sample is a tissue sample.

Other objects, advantages, and novel features of the present invention will become apparent from the following detailed description of the invention when considered in conjunction with the accompanying drawings.

BRIEF DESCRIPTION OF THE DRAWINGS

The present disclosure is described in conjunction with the appended figures.

FIG. 7(a) shows an example of a color image of a prostate tissue sample that was stained with H&E.

FIG. 7(b) shows an example of a hyperspectral image of the prostate tissue sample shown in FIG. 7(a).

DETAILED DESCRIPTION OF THE INVENTION

Figure 1:
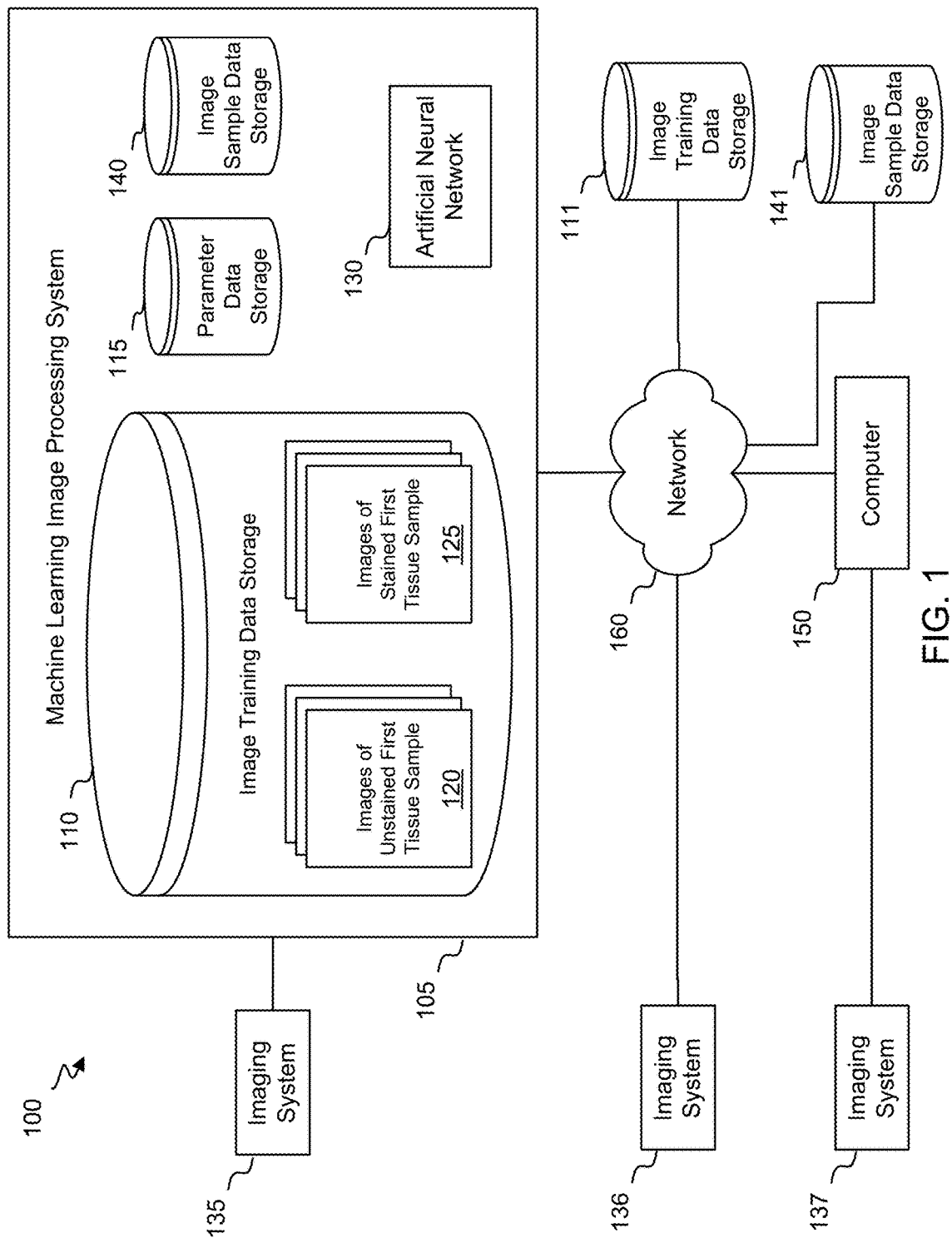
FIG. 1 shows a block diagram of a system for generating virtually stained images of unstained samples according to exemplary embodiments of the invention.

FIG. 1 shows a block diagram of a system 100 for generating virtually stained images of unstained samples according to exemplary embodiments of the invention. As shown in FIG. 1, the system 100 includes a machine learning image processing system 105 and an imaging system 135. The machine learning image processing system 105 may include one or more computers, each of which may include one or more processors and/or a transceiver for communicating with the imaging system 135. The machine learning image processing system 105 may communicate with the imaging system 135 by any suitable connection, such as a wired or wireless network based on Bluetooth or WiFi. Alternatively, the machine learning image processing system 105 and the imaging system 135 may be co-located within a microscope.

The machine learning image processing system 105 may include image training data storage 110, parameter data storage 115, image sample data storage 140, and an artificial neural network 130. Alternatively, some or all of these components may be located remotely, such as in the cloud. Further, some or all of these components may be located within the imaging system 135. The image training data storage 110 may include a plurality of images 120 of an unstained first tissue sample, and a plurality of images 125 of the first tissue sample after it has been stained. Each of the images 120 includes a plurality of spectral images of the unstained first tissue sample, while each of the images 125 includes a plurality of colors that indicate, for each location of a plurality of locations within the image, an extent to which at least one stain binds to the first tissue sample at the location. The parameter data storage 115 may include a set of parameters that characterize the artificial neural network 130. As described in further detail below, the images 120, the images 125, and the parameters may be used to train the artificial neural network 130. Once the artificial neural network 130 has been trained, the artificial neural network 130 may generate virtually stained images from images stored in the image sample data storage 140, wherein each of the images stored in the image sample data storage 140 includes a plurality of spectral images of an unstained second tissue sample.

The first tissue sample may be stained by a variety of methods. For example, the first tissue sample may be stained with a structural stain, such as H&E or Trichrome. Alternatively, the first tissue sample may be stained with a molecular stain, such as CD68 IHC or CD163 IF. Some examples of molecular staining methods that may be used to stain the first tissue sample include immunohistochemistry (IHC), immunofluorescence (IF), in situ hybridization (ISH), fluorescent in situ hybridization (FISH), and RNA (f)ISH. As additional examples, the first tissue sample may be stained with Giemsa stain or Picrosirius red.

The imaging system 135 may be a microscope. As discussed in further detail below, the imaging system 135 may be operated in various modes in order to acquire different images of a sample. For example, the imaging system 135 may be used to acquire the images 120 and the images 125 that are stored in the image training data storage 110. Further, the imaging system 135 may be used to acquire the images that are stored in the image sample data storage 140.

The system 100 may also include a computer 150 that communicates with the machine learning image processing system 105 via a network 160. The computer 150 may also communicate with a standalone imaging system 137 that may perform similar functions as the imaging system 135 discussed above. The computer may access images 120 and images 125 directly from the imaging system 137, or via the network 160 from the image training data storage 110 or another image training data storage 111 that may be located in the cloud. Further, the computer may access images via the network 160 from the image sample data storage 140 or another image sample data storage 141 that may be located in the cloud. In addition, the system 100 may include an imaging system 136 that may be a smart microscope, and that may perform similar functions as the imaging system 135 discussed above.

Figure 2:
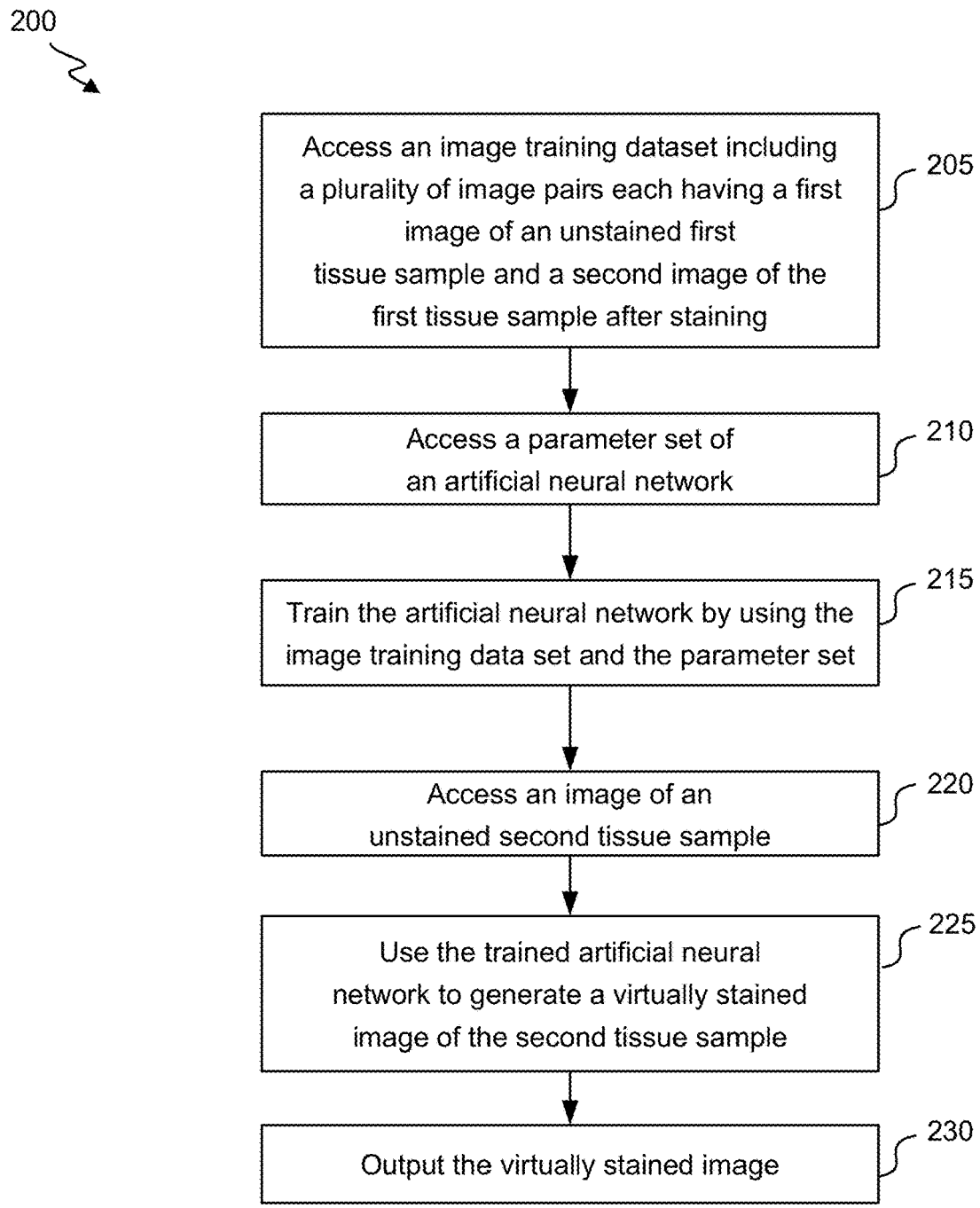
FIG. 2 shows a flow diagram of a method for generating virtually stained images of unstained samples according to exemplary embodiments of the invention.

FIG. 2 shows a flow diagram of a method 200 for generating virtually stained images of unstained samples according to exemplary embodiments of the invention. At block 205, an image training dataset is accessed. For example, the image training dataset may be accessed from the image training data storage 110 or the image training data storage 111. The image training dataset includes a plurality of image pairs, each of which includes a first image 120 of an unstained first tissue sample and a second image 125 of the first tissue sample after staining. As discussed in further detail below, the first image 120 and the second image 125 may be spatially registered.

As shown in FIG. 2, a parameter set of the artificial neural network 130 may be accessed at block 210. For example, the parameter set may be accessed from the parameter data storage 115. The parameter set includes weights that are associated with artificial neurons within the artificial neural network 130. The weights may be set to various initial values. A variety of suitable artificial neural networks 130 may be used, such as U-Net, Seeing More Net, Mask R-CNN, DeepLab, or SegNet. For example, the artificial neural network 130 may be a four-layer deep U-net. The artificial neural network 130 may be convolutional and/or dense. For example, a dense prediction neural network (a network that predicts a label for each pixel in the image) may be used as the artificial neural network 130. In some embodiments, an architecture based on an image to image conditional adversarial network (e.g., Pix2Pix GAN) may be used. In this Pix2Pix GAN model, a U-net may be used for the generator part of the network and a five-layer fully convolutional network (FCN) may be used for the discriminator with a least square loss function. A one-sided smooth label, random label flipping, imbalanced output to input patch size may also be implemented to help the model converge faster. For example, a Pix2Pix network may provide better image resolution and prediction accuracy than the U-Net.

The artificial neural network 130 may then be trained by using the image training data set and the parameter set to adjust some or all of the parameters associated with the artificial neurons within the artificial neural network 130, including the weights within the parameter set, at block 215. For example, the weights may be adjusted to reduce or minimize a loss function of the artificial neural network 130. Some methods that may be used to adjust the weights include the gradient descent method, Newton's method, the conjugate gradient method, the quasi-Newton method, and the Levenberg-Marquardt algorithm.

Various machine-learning techniques may be used to train the artificial neural network 130. Some embodiments may use supervised training methods to train the artificial neural network. For example, the artificial neural network 130 may include a convolutional neural network, and the artificial neural network 130 may be trained by identifying points, edges, connective elements, and/or correlations between attributes within the image 120 and the image 125. In the convolutional neural network, kernels may be used to perform convolution in the two-dimensional spatial domain to extract spatial features to be used as inputs for a subsequent layer. Alternatively, three-dimensional predictions may be performed using image z-stacks, such as from consecutive sections of a sample. Further, other artificial neural network architectures may be used. For example, neighboring waveforms may be incorporated to form a feature vector. Specifically, for each pixel location, the waveform at that pixel location and waveforms from neighboring locations may be stacked together. Further, in a multi-scale artificial neural network, the images may be downsampled in the spatial domain into a series of smaller images. The artificial neural network may be trained for each image, and the output may be fed into a master layer to generate a final output. In addition, some embodiments may use nonlinear logistic regression training method to train the artificial neural network.

As shown in FIG. 2, once the artificial neural network 130 has been trained, the trained artificial neural network 130 may be used to generate a virtually stained image of a second unstained tissue sample. The second tissue sample may include the same tissue type as the first tissue sample that was used to train the artificial neural network 130. Alternatively, the second tissue sample may include a different tissue type from the first tissue sample that was used to train the artificial neural network 130. The second tissue sample may include the same or a different health status as the first tissue sample that was used to train the artificial neural network 130, such as whether the tissue is healthy or diseased with various types of disease and/or severity of disease. An image of the unstained second tissue sample may be accessed at block 220. The image includes a plurality of spectral images of the unstained second tissue sample. For example, the image may be accessed from the image sample data storage 140 or the image sample data storage 141. The trained artificial neural network 130 then uses the image to generate a virtually stained image of the second tissue sample at block 225. The virtually stained image may be generated based on the parameters of the artificial neural network 130 that are adjusted during the training. The virtually stained image may then be output at block 230. For example, the virtually stained image may be transmitted, stored, and/or displayed on various devices.

The virtually stained image may be further processed by various methods. For example, tumor cells in the virtually stained image may be distinguished from normal cells. Further, tumor cells in the virtually stained image may be counted and/or labelled. In addition, the virtually stained image may be processed to suggest a diagnosis and/or a grade for a patient's disease. For example, the probability of different diagnoses may be estimated based on the virtually stained image.

In one example, the image training dataset may be generated by using a microscope in a hyperspectral mode to acquire hyperspectral images, and a color imaging mode to acquire color images. A hyperspectral image includes a plurality of spectral images, each of which is a two-dimensional spatial image that includes data from a different wavelength band. For example, the hyperspectral image may include tens or hundreds of spectral images that have bandwidths between 10 nm and 20 nm, or bandwidths less than 10 nm, such as between 1 nm and 6 nm. The hyperspectral image may be generated via different excitation and/or emission wavelengths. The spectral images may combined to form a three-dimensional $(x,y,\lambda)$ hyperspectral data cube for processing and analysis, where x and y represent two spatial dimensions, and $\lambda$ represents the spectral dimension. A color image typically includes three colors, such as red, green, and blue. Alternatively, a grayscale image having shades of gray may be generated instead of a color image. As yet another example, the color image may include multiple colors from a sample that is stained with multiple dyes. The number of colors in the color image is not limited to three, and may include more than three colors.

The microscope may simultaneously collect spectrally resolved autofluorescence images from the sample when operating in the hyperspectral mode. Autofluorescence refers to the natural emission of various wavelengths of light by biological structures such as mitochondria and lysosomes after absorbing light of other wavelengths. In contrast to images acquired by other modalities, such as bright field imaging, the hyperspectral autofluorescence images carry information about the molecules within the sample. In particular, as shown in the examples below, the hyperspectral autofluorescence images carry sufficient molecular information for use in simulating various types of staining, such as H&E staining, CD68 IHC staining, and CD163 IF staining. Alternatively, the microscope may collect spectrally resolved spontaneous or stimulated Raman emission from the sample. As another example, the microscope may collect spectrally resolved multi-photon emission from the sample. Additional examples include hyperspectral reflectance or absorption, multi-photon fluorescence, second harmonic generation (SHG), and third harmonic generation (THG). More generally, the microscope may collect various types of spectrally resolved intrinsic signal from the sample.

A spectrally resolved signal includes portions for a wavelength or a range of wavelengths. An intrinsic signal is generated by the sample, and may include spontaneous or stimulated emission.

In another example, the image training dataset may be generated by using a microscope in a multispectral mode to acquire multispectral images, and a color imaging mode to acquire color images. A multispectral image includes a plurality of spectral images, each of which is a two-dimensional spatial image that includes data from a different wavelength band. For example, the hyperspectral image may include 3 to 15 spectral images that have bandwidths between 50 nm and 150 nm. The multispectral image may be generated via different excitation and/or emission wavelengths. The spectral images may be combined to form a three-dimensional (x,y,λ) multispectral data cube for processing and analysis, where x and y represent two spatial dimensions, and λ represents the spectral dimension. The microscope may have a plurality of spectral channels that are used sequentially to generate a multispectral image. An example of parameters that may be used for acquiring the multispectral images is shown in Table 1.

|  | Name | Excitation wavelength (nm) | Emission wavelength (nm) | Exposure time (ms) |
|---|---|---|---|---|
| 1 | ExEm_1_1 | 355-385 | 430-500 | 100 or 50 |
| 2 | ExEm_1_2 | 355-385 | 500-550 | 100 |
| 3 | ExEm_1_4 | 355-385 | 570-650 | 100 |
| 4 | ExEm_2_1 | 390-420 | 430-500 | 100 |
| 5 | ExEm_2_2 | 390-420 | 500-550 | 100 |
| 6 | ExEm_2_4 | 390-420 | 570-650 | 100 |
| 7 | ExEm_3_2 | 435-460 | 500-550 | 150 |
| 8 | ExEm_3_4 | 435-460 | 570-650 | 150 |
| 9 | ExEm_4_2 | 460-490 | 500-550 | 150 |
| 10 | ExEm_4_4 | 460-490 | 570-650 | 150 |
| 11 | ExEm_5_4 | 490-515 | 570-650 | 200 |
| 12 | ExEm_5_5 | 490-515 | 655-705 | 200 |
| 13 | ExEm_6_4 | 530-560 | 570-650 | 200 |
| 14 | ExEm_6_5 | 530-560 | 655-705 | 200 |
| 15 | ExEm_7_5 | 615-645 | 655-705 | 300 |
| 16 | ExEm_1_7 | 355-385 | 705-845 | 100 |
| 17 | ExEm_2_7 | 390-420 | 705-845 | 100 |
| 18 | ExEm_3_7 | 435-460 | 705-845 | 150 |
| 19 | ExEm_4_7 | 460-490 | 705-845 | 150 |
| 20 | ExEm_5_7 | 490-515 | 705-845 | 200 |
| 21 | ExEm_6_7 | 530-560 | 705-845 | 200 |
| 22 | ExEm_7_7 | 615-645 | 705-845 | 300 |
| 23 | ExEm_8_7 | 650-675 | 705-845 | 300 |
| 24 | Brightfield | N/A | N/A | 1 |

Figures 3A, 3B:
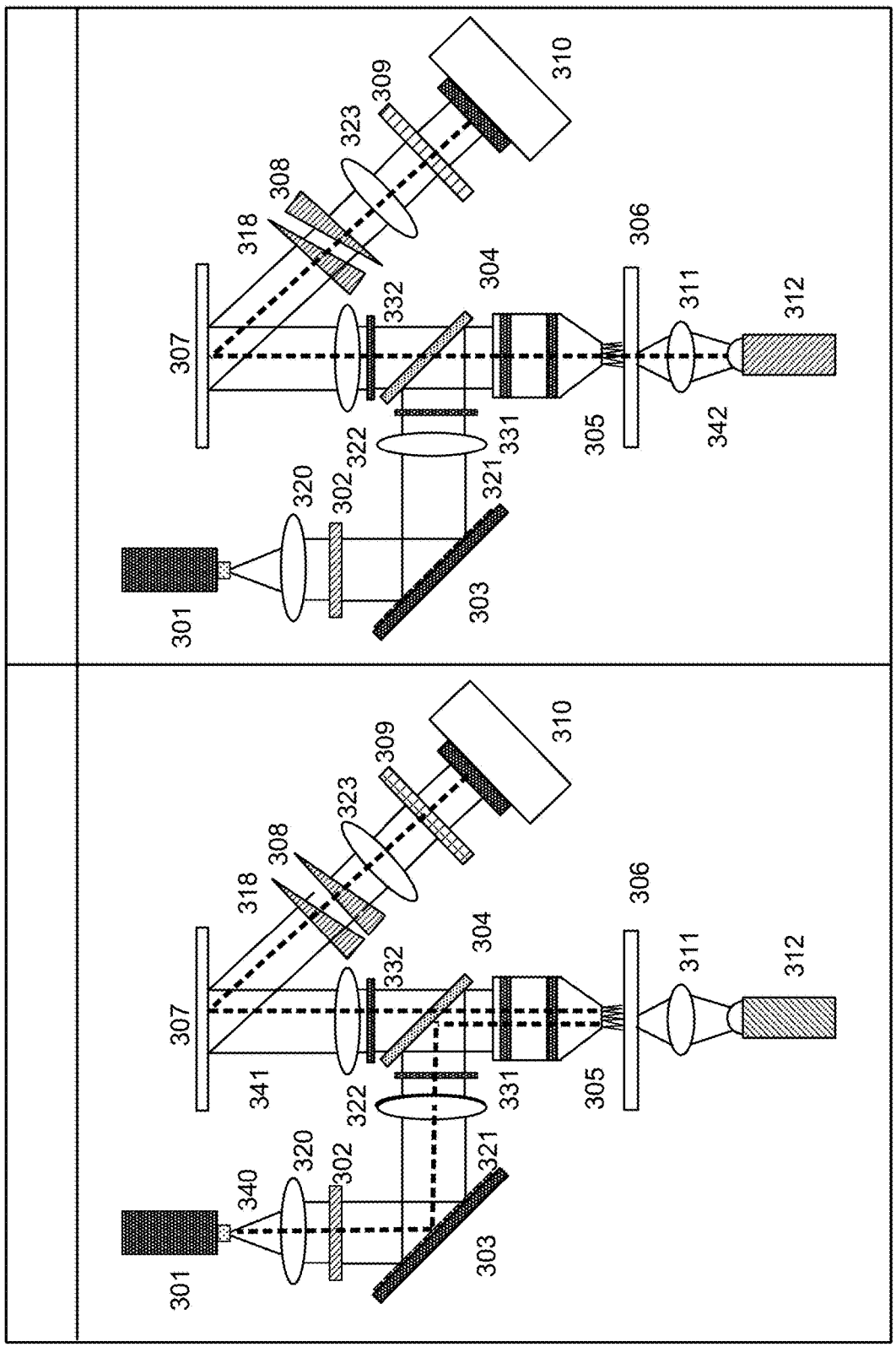
FIG. 3(a) shows a diagram of a microscope that is configured to operate in a hyperspectral mode.
FIG. 3(b) shows a diagram of a microscope that is configured to operate in a color imaging mode.

FIG. 3(a) shows a diagram of a microscope that is configured to operate in the hyperspectral mode, and FIG. 3(b) shows a diagram of a microscope that is configured to operate in the color imaging mode. In each figure, the path of the light is illustrated by the dashed line. More detailed descriptions of various components and operation of the microscope shown in FIG. 3(a) can be found in U.S. application Ser. No. 15/607,457 filed on May 27, 2017 and U.S. application Ser. No. 15/607,455 filed on May 27, 2017. Each of these applications is hereby incorporated by reference in its entirety for all purposes. As shown in FIG. 3(a), in the hyperspectral mode, a light source 301, such as a laser or a light emitting diode (LED), emits excitation light 340 at a suitable wavelength, such as 405 nm. In other embodiments, a plurality of wavelengths from a single light source 301 or a plurality of light sources 301 may be used. The excitation light 340 is collimated by a lens 320 and passes through a laser line filter 302 that transmits light at the wavelength(s) emitted by the light source 301. The excitation light 340 is then incident on a digital micromirror device (DMD) 303, which may structure the excitation light 340 by modulating the phase or amplitude of the excitation light 340 by selectively actuating or switching the micromirrors of the DMD 303. At least a portion of the micromirrors of the DMD 303 reflect the excitation light 340 toward a lens 321 and an optical filter 331. As an alternative to the DMD 303, another suitable spatial light modulator may be used. For example, cylindrical lenses may be used, either as singular elements or as an array. As other examples, scanned lenslet arrays or reflective components may be used. A beamsplitter 304 such as a dichroic mirror then reflects the excitation light 340 toward a microscope objective lens 305, which focuses the excitation light 340 on a sample 306.

The excitation light 340 that is incident on the sample 306 causes biological structures within the sample 306 to emit autofluorescence light 341. The autofluorescence light 341 is collected and/or collimated by the microscope objective lens 305. The autofluorescence light 341 then passes through the beamsplitter 304, an optical filter 332, and a lens 322, after which it is reflected by a mirror 307. The beamsplitter 304 blocks the excitation light 340 from progressing into the detection system. The autofluorescence light 341 is then dispersed by a pair of double Amici prisms 308 and 318, focused by a lens 323, and imaged by a camera 310. A more detailed description of the pair of double Amici prisms 308 and 318 can be found in U.S. application Ser. No. 15/481,385, filed on Apr. 6, 2017. This application is hereby incorporated by reference in its entirety for all purposes. The dispersion of the light may be maximized by aligning the double Amici prisms 308 and 318 such that an angle of rotation between the double Amici prisms 308 and 318 about the optical axis is 0°. In other embodiments, various dispersive elements may be used in place of the double Amici prisms 308 and 318, such as gratings or Jansen prisms. For example, the camera 310 may be a two-dimensional imaging device such as an sCMOS camera, which uses a hybrid charge-coupled device (CCD) and complementary metal-oxide-semiconductor (CMOS) architecture. In one example, CMOS readout integrated circuits (ROICs) may be bump bonded to a CCD imaging structure. In another example, a CCD-like structure may be implemented in CMOS technology. A color filter 309 is removed from the beam path in the hyperspectral mode shown in FIG. 3(a). The spectra may be measured in a sequence by using different filters.

Once the first image 120 of the unstained sample 306 has been collected in the hyperspectral imaging mode shown in FIG. 3(a), the sample 306 may be stained with a suitable dye, such as H&E, and the microscope may be modified as discussed below to operate in the color imaging mode shown in FIG. 3(b). As shown in FIG. 3(b), white light 342 from an LED 312 is focused on the sample 306 by a high numerical aperture condenser lens 311. For example, the LED may have a color temperature of approximately 3000 K, and the high numerical aperture condenser lens 311 may have a numerical aperture of approximately 0.7. The white light 342 then passes through the microscope objective lens 305, the beamsplitter 304, the optical filter 332, and the lens 322, after which it is reflected by the mirror 307. The pair of double Amici prisms 308 and 318 may be set to zero dispersion or a minimum dispersion in the color imaging mode. For example, one of the double Amici prisms 308 may be rotated by 180° about the optical axis with respect to the other double Amici prism 318. The color filter 309, which may include three independent color filters, is then used to transmit red, blue, and green channels sequentially to the camera 310. Each image 125 acquired in the color imaging mode indicates an extent to which the stain binds to the sample 306 as a function of the spatial locations of the sample 306. Each spatial location includes red, blue, and green components. As discussed above, although FIG. 3(b) is described as a color imaging mode that generates color images, a similar technique could also be used to generate grayscale images.

Figures 4A, 4B:
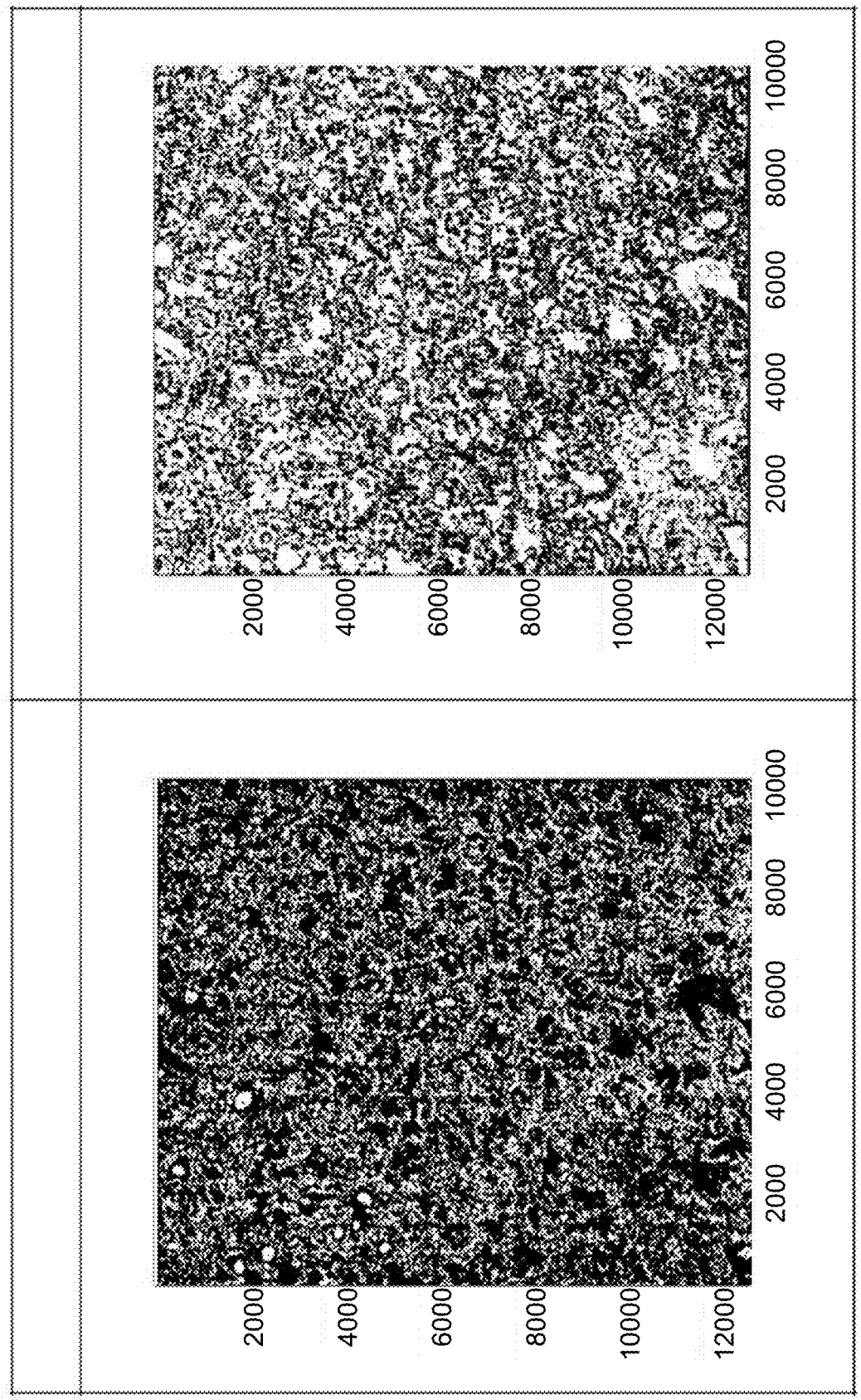
FIG. 4(a) shows an image of an unstained sample that was acquired in hyperspectral mode.
FIG. 4(b) shows an image of a stained sample that was acquired in color imaging mode.

FIGS. 4(a) and 4(b) show an example of an image pair of a formalin-fixed, paraffin-embedded (FFPE) prostate tissue sample that was acquired by the methods discussed above. FIG. 4(a) is an image 120 of an unstained sample that was acquired in hyperspectral mode, and FIG. 4(b) is an image 125 of the same sample that was acquired in color imaging mode after the sample was stained with H&E. For each image pair, the image 120 and the image 125 may be spatially registered, such that each pixel in the image 120 is associated with a respective pixel in the image 125, and/or each pixel in the image 125 is associated with a respective pixel in the image 120.

In order to spatially register the image 120 and the image 125, the sample 306 may be mounted on the same slide holder within the microscope before and after staining. In this example, because the same microscope objective lens 305 and camera 310 are used in the hyperspectral mode and the color imaging mode, any registration errors between the image 120 and the image 125 within an image pair are minimized. It is possible to correct for mechanical shifts that may occur in the sample position before and after the sample is stained by shifting one of the images with respect to the other image. Further, the image 125 may be scaled by a suitable factor, such as within a range between 0.5 and 1.5, to account for the pixel size difference between the DMD 303 and the camera 310. The image 120 may be rotated by a suitable amount, such as within a range between 0 and 180 degrees, to ensure an accurate tiling alignment. The scaling and rotation factors may be determined based on the characteristics of the imaging system, or by an image processing analysis. Further, the image 125 may be transposed to ensure an accurate tiling orientation. The image 125 may then be registered to the corresponding image 120 by using an affine transformation by maximizing mutual information, such as by using the imregtform function in Matlab®. As an alternative to maximizing mutual information, cross-correlation may be used, and the cross-correlation may be filtered. Various alternative methods may be used to register the image 125 to the corresponding image 120. For example, the image 125 may be globally aligned with the corresponding image 120, and then the image 125 may be locally aligned with the corresponding image 120, such as by elastic transformation, similarity matching, and/or rigid transformation. Multiple local affines may be used. Alternatively, a non-rigid transformation such as global or local warping could be used. As another example, B-spline interpolation may be used.

Figure 5:
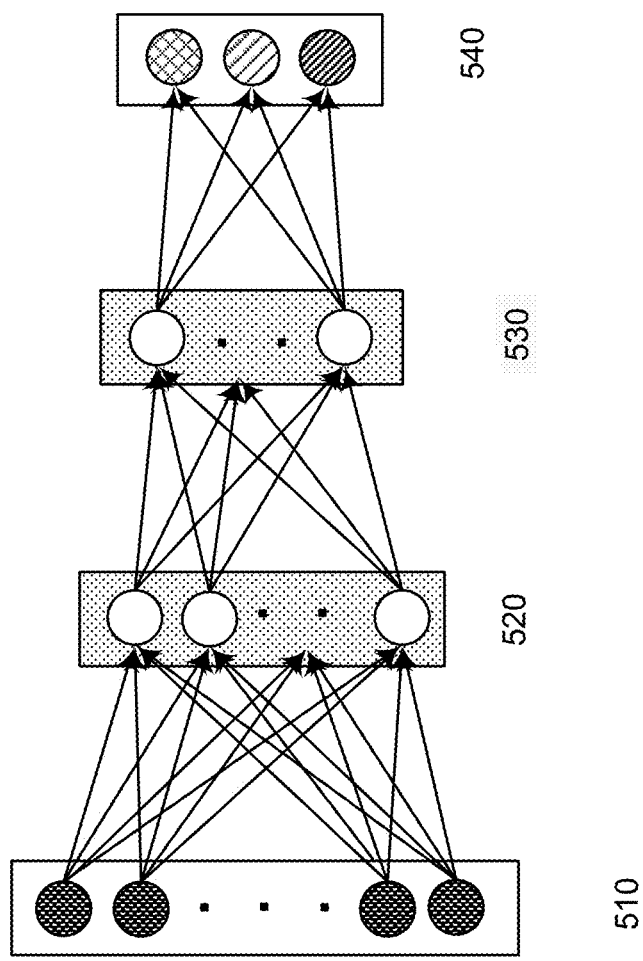
FIG. 5 shows an example of a structure of an artificial neural network.

FIG. 5 shows an example of a structure of the artificial neural network 130. In this example, an input layer 510 includes a plurality of dimensions corresponding to the number of spectral channels, each of which has a different wavelength band, in each of the images 120. For example, the input layer 510 may include 140 dimensions corresponding to 140 spectral channels between 400 nm and 800 nm for each spatial pixel in the image 120. This fine spectral resolution may be used to generate high-quality virtual stained images, because different tissue elements, such as stroma, nuclei, and cytoplasm, have subtle differences in their spectral profiles and/or shapes.

As shown in FIG. 5, the artificial neural network 130 also includes hidden layers 520 and 530. Each of the hidden layers 520 and 530 includes a plurality of artificial neurons. Although two hidden layers are shown, the artificial neural network 130 may include various numbers of hidden layers. The artificial neural network 130 also includes an output layer 540, which may include three artificial neurons that are used to predict red, green, and blue values independently. Alternatively, the output prediction may include the underlying signals, which can be further selected, mixed, adjusted, and colored to red, green, and blue values. In another example, each output neuron may represent the concentration of one type of dye molecules. Any suitable number of output neurons may be used. For example, each output neuron may correspond to a staining signal from hematoxylin, eosin, CD68, and/or another type of dye molecule. The output layer 540 may include a suitable number of artificial neurons to predict a corresponding number of colors. The number of artificial neurons in each layer may be varied to yield the best results. In one example, the input layer 510 included 140 artificial neurons, the first hidden layer 520 included 70 artificial neurons, the second hidden layer 530 included 35 artificial neurons, and the output layer 540 included 3 artificial neurons. As discussed above, parameters of the artificial neural network 130, including weights of connections between the neurons within the hidden layers 520 and 530, are adjusted during the training of the artificial neural network 130.

Figure 6:
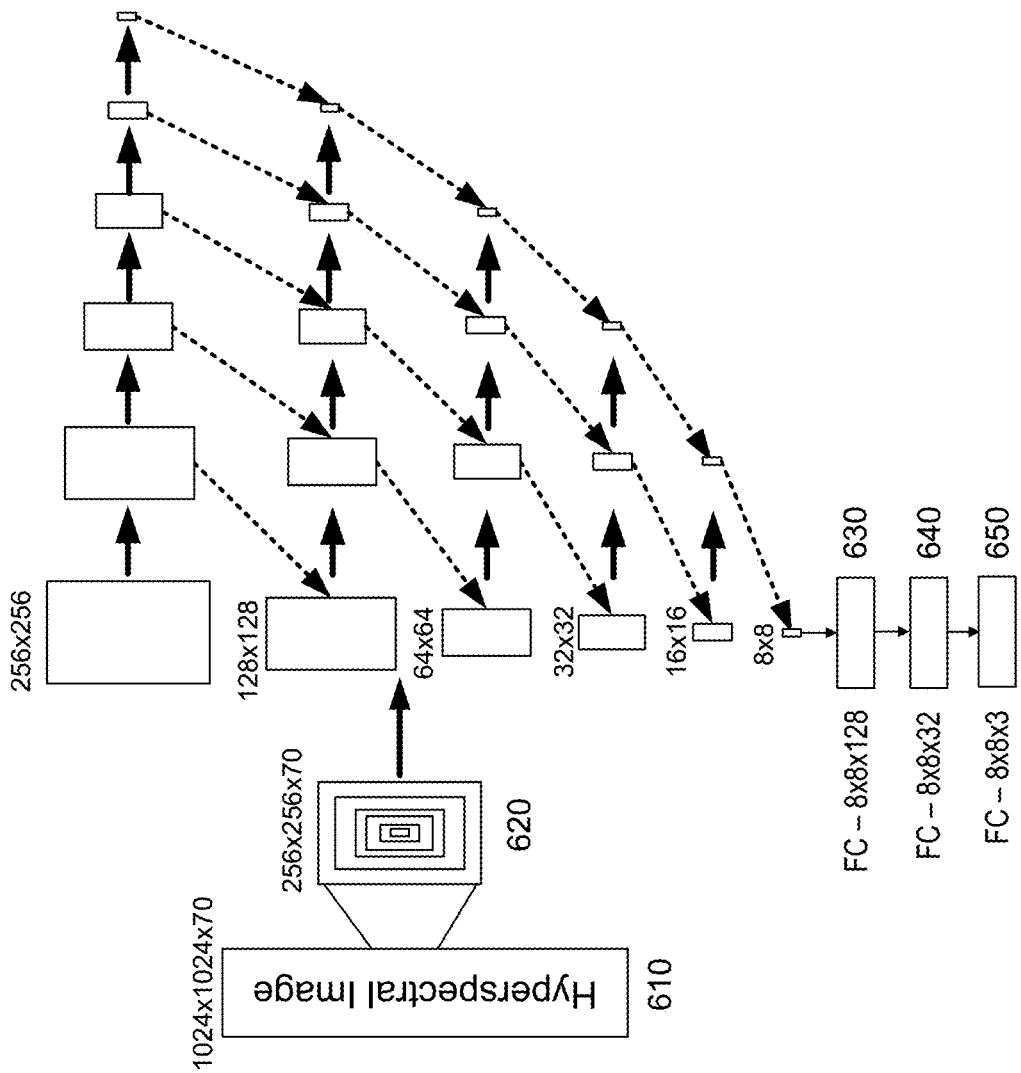
FIG. 6 shows an example in which hyperspectral images are used as features and color images are used as labels while training the artificial neural network.

FIG. 6 shows an example in which hyperspectral images are used as features and color images are used as labels while training the artificial neural network 130. As shown in FIG. 6, multiple 256×256 patches 620 are extracted from a hyperspectral image 610 and each patch 620 is used to create smaller concentric patches (128×128, 64×64, 32×32, 16×16, and 8×8). The patches 620 may be identified using a pseudo-random selection technique. Each patch 620 goes through multiple convolution and maximum pooling layers until it reaches a size of 8×8. In this example, two sequential 24 3×3 kernels having a stride size of 1 were used to perform convolutions from the previous layer, and 2×2 maximum pooling having a stride size of 2 was applied to reduce the image size by a factor of 2 on each layer until the image size reached 8×8. To align spatial features and maintain magnification, all maximum pooled patches were then up-resized (i.e. nearest neighbor interpolation) back to their original sizes and were cropped around the center to reduce the size of each patch by a factor of two. Same-sized patches were concatenated in between layers, such that the feature dimension was merged, as shown by the diagonal arrows. The final 8×8×n (n~500) layer is connected to a fully connected (FC) layer 630 with 8×8×128=8192 neurons and is then reduced to an FC layer 640 with 8×8×3=252 neurons, which are used to predict the RGB values of the 8×8 pixels in a co-registered color image 650.

FIG. 7(a) shows an example of a color image of a prostate tissue sample that was stained with H&E. FIG. 7(b) shows an example of a hyperspectral image of the same prostate tissue sample. The artificial neural network 130 was trained by using the pixels in Training region 1 and Training region 2 of the image in FIG. 7(b). The trained artificial neural network 130 was then used to generate a virtually stained image within region 720 of the hyperspectral image shown in FIG. 7(b). A comparison of region 720 of FIG. 7(b) with corresponding region 710 of FIG. 7(a) shows that the virtually stained image closely resembles a color image of the sample that was stained with H&E.

Figures 8A, 8B:
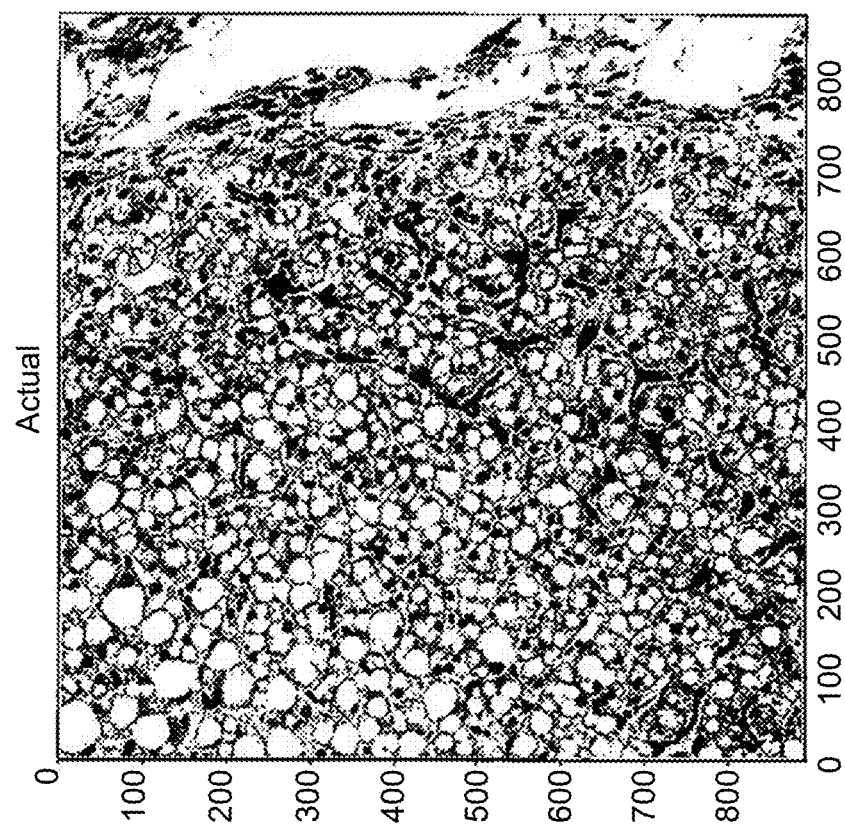
FIG. 8(a) shows an example of a virtually stained image of a liver tissue sample.
FIG. 8(b) shows an example of a color image of the liver tissue sample.

FIG. 8(a) shows an example of a virtually stained image of a liver tissue sample that was generated by the methods discussed above. FIG. 8(b) shows an example of a color image of a liver tissue sample that was stained with CD68 via IHC. A comparison of FIG. 8(a) with FIG. 8(b) shows that the virtually stained image closely resembles the color image of the sample.

In addition to training the artificial neural network 130 to predict staining of a tissue sample as discussed above, exemplary embodiments of the invention may train the artificial neural network 130 using whole cells that are deposited or cultured onto a slide, dish, or well. This provides for phenotypic prediction of bulk cell populations, such as mixed peripheral blood mononuclear cells (PBMCs), individual phenotypes from cell lines, and induced pluripotent stem cells (iPSCs). In addition, cell populations of interest may be embedded in microarrays and imaged to provide image training datasets for the artificial neural network 130. Exemplary embodiments of the invention may also provide for the detection and measurement of cell populations in blood smear.

In some embodiments, multiple artificial neural networks may be trained using tissue having different characteristics that may be produced by different types of tissue, different sample preparation methods, and/or different sample sources. For example, a first artificial neural network may be trained using prostate tissue, and a second artificial neural network may be trained using colon tissue. In this example, a sample including prostate tissue would be analyzed by the first artificial neural network, and a sample including colon tissue would be analyzed by the second artificial neural network. Alternatively, a single artificial neural network may be trained using tissue having different characteristics that may be produced by different types of tissue, different sample preparation methods, and/or different sample sources. In this example, samples including prostate tissue or colon tissue would be analyzed by the single artificial neural network. The dimensionality of the single artificial neural network would be increased to include a sufficient number of training parameters.

Exemplary embodiments of the invention may provide several advantages. For example, because the sample is not stained, the sample can be preserved and is not damaged by the staining process. In addition, because the sample does not need a coverslip for imaging, the sample can be used directly for downstream analyses such as proteomics and transcriptomics for personalized medicine applications. The sample may be evaluated in real time, and the sample can be prepared at the time of surgery. Further, the biological structure organization of the sample may be directly linked to endogenous fluorophores, which may add value to traditional pathology. In addition, spectral signals and morphological features can be used to infer underlying molecular signature in tissue.

Embodiments of the present invention also provide systems and methods for using a neural network, such as an example neural network described herein, to predict images with enhanced spatial resolution. More specifically, exemplary embodiments may include transforming lower spatial resolution multispectral images to high- or super-resolution images, such as RGB or monochrome images, using data-driven deep learning frameworks. Transforming lower spatial resolution images to higher spatial resolution images may be particularly helpful when capturing high-resolution images is unavailable, costly, slow, or otherwise difficult.

Training a neural network to perform resolution enhancement may include processes as described herein. For example, an image training dataset may include a plurality of image pairs. A first image of the image pairs may include a first plurality of spectral images. The first plurality of spectral images may be at a low spatial resolution, as described further herein below. Each spectral image of the first plurality of spectral images may include data from a different wavelength band. The images may be aligned so that the image coordinates are co-registered. After alignment, a neural network (e.g., convolutional neural network) may be trained using the multiple images. After the neural network is trained, the neural network may be applied to an input image, such as a multispectral image at low spatial resolution. As described herein, the input images may include a first input image (e.g., that may be captured before a tissue is stained), and a second input image (e.g., that may be captured after the tissue is stained). However, the input images may include two unstained images, or two stained images, among other combinations. Furthermore, the subject of the images may not even include a tissue sample, or even a biological sample. For example, the subject may include objects in satellite imaging (e.g., outer space). Furthermore, as described herein, one or more of the input images may include autofluorescence images. However, the input images may also not include an autofluorescence image, and may instead include images of other modalities.

As noted, the spectral images that are used to train the neural network and that may be used as an input to the trained neural network may be at a low spatial resolution. For example, the spatial resolution of the spectral images may be lower than the spatial resolution of the output of the trained neural network after the neural network is applied to the input spectral images. In some example embodiments, an image at "low spatial resolution" may be an image at approximately 2 microns per pixel. In some embodiments, an image at "high spatial resolution" or resolution improved from low spatial resolution may be an image at approximately 0.25 microns per pixel. Therefore, in such an embodiment where an image of low spatial resolution of 2 microns per pixel was improved to an image of high spatial resolution at 0.25 microns per pixel would include an 800% or 8× improvement in spatial resolution. In some embodiments, the resolution enhancement may be within a range of 2× to 8× (i.e., an output having 2 to 8 times higher resolution in each dimension, or 2×2 to 8×8 improvement for 2D images, as compared to the input). For example, with respect to pathology samples, images may increase in pixel resolution from an input resolution range of 2 to 16 microns to an output resolution range of 0.25 to 2 micron pixel size (e.g., for typical pathology imaging). In an embodiment, for example, the increase in resolution may go from 4 microns at the input to 0.25 microns at the output.

As noted, an image training dataset for training the neural network may include a plurality of image pairs, each of which may include a multispectral image that includes a plurality of spectral images. The number of spectral images include in the plurality of spectral images may be strategically chosen to maximize the increase of spatial resolution of the input image as caused by the trained neural network. Furthermore, each spectral image of the first plurality of spectral images may include data from a different wavelength band. The wavelength band of each spectral image of the plurality of spectral images may also be strategically chosen to maximize the increase of spatial resolution of the input image as caused by the trained neural network. For example, the number of spectral images in the multispectral image and the specific wavelength bands of each spectral image may be chosen to maximize spatial resolution enhancement while avoiding use of additional, unnecessary spectral images that may cause training of the neural network or application of the neural network to slow down without adding sufficient value in enhanced spatial resolution.

Using the trained neural network to enhance the spatial resolution of an input multispectral image may also yield an output that has reduced spectral resolution. As noted, an image in the image training dataset, and an input image to which the trained neural network is applied, may include a multispectral image. The multispectral image may include a certain specific number of spectral images. When the trained neural network is applied to an input multispectral image that includes the specific number of spectral images, the output of the neural network may include an image that includes a fewer number of spectral images than the specific number of spectral images of the input.

Figure 9:
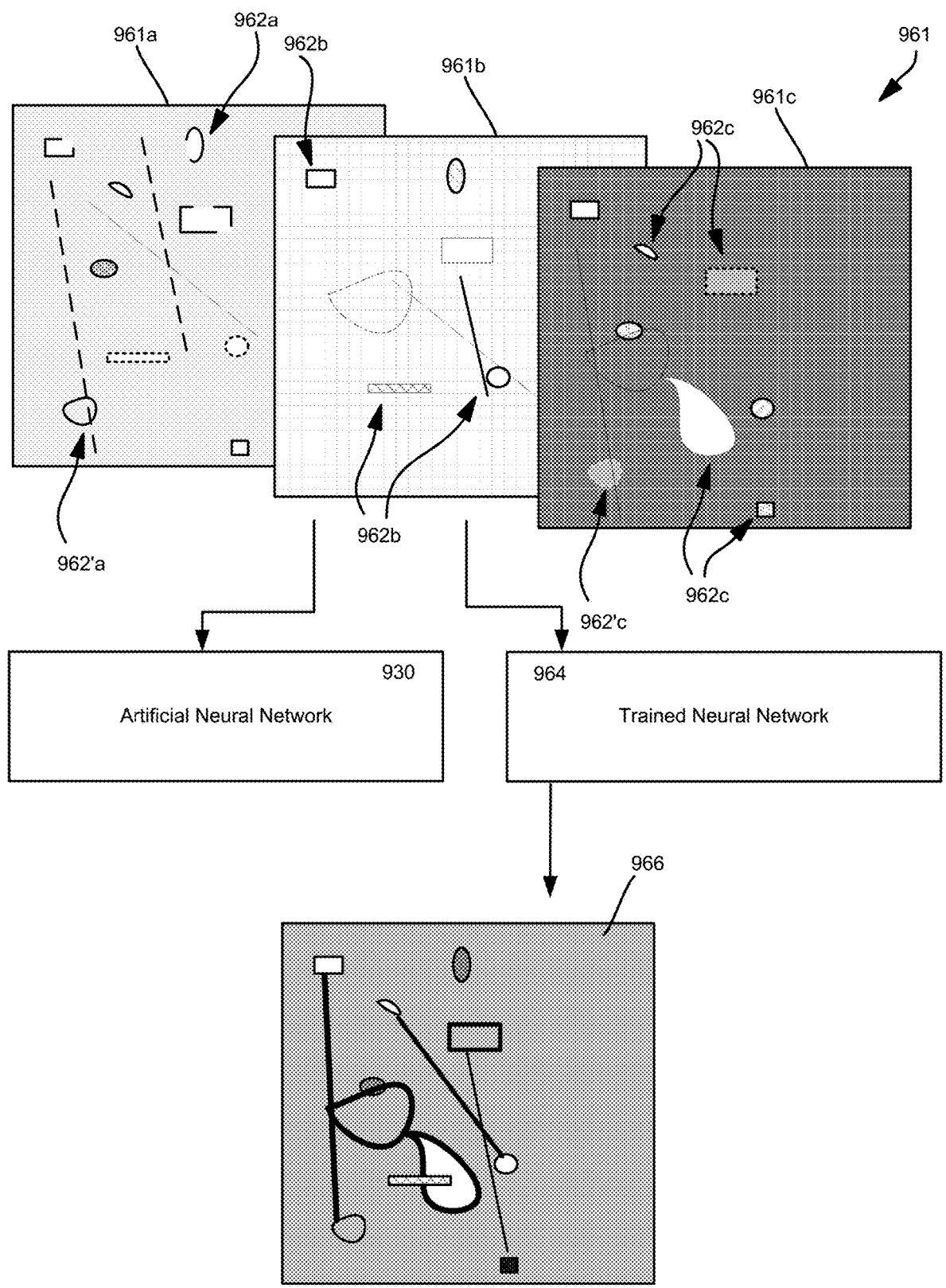
FIG. 9 is a block diagram showing an illustration of a multispectral image used to train an artificial neural network or as an input to a trained neural network, according to embodiments of the present technology.

FIG. 9 is a block diagram showing an illustration of a multispectral image used to train an artificial neural network or as an input to a trained neural network, according to embodiments of the present technology. Input image 961 is a multispectral image with spectral images 961a-c. Spectral images 961a-c may each include data from a different wavelength band. The multispectral image may be captured using a device that has instruments that are sensitive to particular wavelengths, and therefore the intensity of the multispectral image may be represented across multiple frequencies. For example, spectral image 961a may be captured at a first channel with an excitation filter pass band of 355-385 nm and an emission filter pass band of 430-500 nm, spectral image 961b may be captured at a second channel with an excitation filter pass band of 355-385 nm and an emission filter pass band of 500-550 nm, and spectral image 961c may be captured at a third channel with an excitation filter pass band of 355-385 nm and an emission filter pass band of 570-650 nm. However, as discussed further herein, both the number of channels and the wavelength bands may be chosen, either by a person or automatically using software, based on a variety of factors, including the subject being imaged (e.g., a biological sample, such as a tissue sample). An example set of seven channels with excitation and emission filter pass bands are shown and described with respect to FIG. 10.

Spectral images 961a-c may include features 962a-c. For example, as shown in FIG. 9, spectral image 961a may include features 962a, spectral image 961b may include features 962b, and spectral image 961c may include features 962c. Spectral images 961a-c may each capture and include different features, or different aspects of the same features, since the spectral images 961a-c are captured at different wavelength ranges. In other words, each spectral image 961a-c may include different information about the subject of the image, such as a biological sample. Since each spectral image may include different information about the subject, each spectral image may contribute information to determining a prediction of what a possible spatially enhanced version of the image may include or look like, such as an output of the trained neural network 964.

Although input image 961 is shown as having three spectral images 961a-c, input image 961 may include any number of spectral images. For example, input image 961 may include seven different spectral images, each captured at a different wavelength range, such as those shown in the example set of channels shown in FIG. 10. Furthermore, each of illustrated spectral images 961a-c are shown to include a certain number and type of features 962a-c, but such illustrated spectral images 961a-c, and actual spectral images that may correspond to the illustrated spectral images 961a-c, may include more or fewer features, and may include any different kind, size, shape, etc. features that may be captured by an image capturing device.

Input image 961 may be used as one or more images of an image training dataset to an train artificial neural network, such as artificial neural network 930. Artificial neural network 930 may be similar to or the same as artificial neural network 130 described in FIG. 1. Referring back to FIG. 1, the machine learning image processing system 105 as described with respect to FIG. 1 may include image training data storage 110, parameter data storage 115, image sample data storage 140, and an artificial neural network 130. The image training data storage 110 may include a plurality of images 120 of, for example, a first tissue sample and a plurality of images 125 of the tissue sample. Each of the images 120 may include a plurality of spectral images (e.g., of the unstained first tissue sample), while each of the images 125 may include a plurality of colors. The plurality of images 120 may include images of any suitable subject, such as a tissue sample, and the tissue sample may be unstained or stained. Similarly, the plurality of images 125 may include images of any suitable subject, such as a tissue sample (but the subject is typically the same subject as in images 120, even if the subject has been changed, such as by staining), and the tissue sample may be unstained or stained.

Since artificial neural network 930 may be trained using a training dataset that includes a multispectral image that includes a plurality of images such as spectral images 961a-c, and since spectral images 961a-c may each capture and include different features or different aspects of the same features, those features may be used to train the artificial neural network 930. In other words, since each spectral image 961a-c may include different information about the subject of the image, each spectral image may contribute information to training the artificial neural network 930 to be able to generate predictions for spatially enhanced versions of input images. For example, the training dataset may include many different pairs of images, where one image of each pair of images includes a multispectral image with spectral images that each include various information about the subject of the images.

Trained neural network 964 may be a neural network similar to or the same as one or more neural networks described herein after being trained. For example, neural network 964 may be a convolutional neural network that is trained using a similar process to that described herein with respect to FIG. 2. As described herein, the multispectral image 961 may be used as a portion of an image training dataset for training the neural network. Furthermore, multispectral image 961 or another multispectral image may be used as an input to an already-trained neural network, such as trained neural network 964. Similar to the training process, since spectral images 961a-c may each capture and include different features or different aspects of the same features, those features may be used to determine an output image 966 using the artificial neural network 930. In other words, since each spectral image 961a-c may include different information about the subject of the image, each spectral image may contribute information to determining a spatially enhanced output image 966. Since the neural network 964 has already been trained using other inputs, such as other multispectral images and other types of images, the trained neural network 964 may generate an output image 966 that includes high resolution.

The multispectral image 961 may be captured at a low spatial resolution. For example, the image training dataset used to train artificial neural network 930 may include a plurality of multispectral images, such as multispectral image 961, that are used to train the neural network may be captured at a low spatial resolution. In example embodiments, the input multispectral image, such as multispectral image 961, may also be captured at a low spatial resolution. For example, the spatial resolution of the spectral images may be lower than the spatial resolution of the output 966 of the trained neural network 964 after the neural network is applied to the input spectral images 961. In example embodiments, an image may be captured at higher spatial resolution, and then downsampled so that it is at a lower spatial resolution when it is used as an input into the trained neural network 964 or as part of a training dataset for artificial neural network 930.

As shown in FIG. 9, spectral images 961*a-c* may be at a lower resolution than output image 966. Since spectral images 961*a-c* may be at a lower resolution, one or more features 962*a-c* of spectral images 961*a-c* may also be at a lower resolution. Therefore, features 961*a-c* may be blurry, or may not include as much detail, as similar features in output image 966. For example, features 962*a-c* may be missing portions of the features of the subject of the image, features 962*a-c* may be faint or difficult to see in the spectral images 961*a-c*, among other deficiencies. However, the multiple spectral images 961*a-c* may be analyzed, such as by a neural network such as trained neural network 964, to compile the various information provided by the multiple spectral images 961*a-c* to generate a prediction, or output image 966. For example, while one feature in spectral image 961*a* may be faint, blurry, incomplete, or non-existent, another spectral image in the multispectral image 961 stack may provide complementary information. For example, spectral image 961*b* may include the same feature, and that feature may be clearer, less blurry, or more complete than that feature in spectral image 961*a*. The information provided by the multiple spectral images 961*a-c* may provide a more complete set of features that can be used to generate output image 966. The combination of spectral images captured at different frequency bands may allow a neural network to generate an output image 966 that represents the subject of the input images with greater detail and specificity, and higher spatial resolution. The combination of spectral images and information gathered from the combination of images may also allow the neural network to reveal otherwise hidden information. For example, that combination of information may allow the neural network to predict that certain features may be present in the subject without that feature even being present in any of the spectral images, based on the information in the spectral images and the relationship between that information within each image and between different images. In other words, deep pixels within certain of the spectral images may allow the neural network to uncover finer details of the subject and predict a more accurate output image as compared to an input with only a single image. More specifically, when autofluorophores are excited and emit in different channels, the neural network may use the intensity, texture, and other properties of their signal in autofluorescence images (e.g., in tissue sample images) to learn super-resolution and cross-modality predictions.

In one example, feature 962'*a* in spectral image 961*a* includes a complete and clear outline but includes very little or no detail within the outer boundary of the feature. Feature 962'*c* from spectral image 961*c*, which appears to be the same feature as 962'*a* from spectral image 961*a*, but includes very different information. Specifically, feature 962'*c* includes a faint and incomplete outline, but includes more detail within the outer boundary of the feature. Furthermore, even though spectral image 961*b* captured the same or a similar subject to spectral images 961*a* and 961*c*, spectral image 961*b* did not capture feature 962'*a* (or 962'*c*) at all. Therefore, the combination of the spectral images 962*a-c* provide more information than any individual spectral image from multispectral image 961, and allow for a neural network to predict and generate an output image, such as 966, with greater detail and higher resolution. Such an output image may include characteristics that may typically be used for disease screening, diagnosis, staging, and therapeutic response determinations by pathologists. The output image may be used by pathologists to determine if, for example, cancer patients may respond to certain immunotherapy drugs.

In addition to increasing spatial resolution from the lower resolution input images to the higher resolution output image(s), the spectral resolution may also be decreased at the same time. For example, example embodiments may include transforming lower spatial resolution multispectral images to high- or super-resolution images, such as RGB or monochrome images which may include fewer spectral channels. In other words, for any given pixel in an input image, the output image may include fewer values associated with each pixel while having pixels that are smaller in size. RGB images typically include three spectral channels, and monochrome images typically include one spectral channel. Through optimizing the number of spectral channels to increase or maximize the resolution of the output image, the number of spectral channels may likely be greater than three for the input image (e.g., seven channels, as in the example shown and described below with respect to FIG. 10). Therefore, in such an example, the number of spectral channels may decrease from the multispectral image(s) used for the training dataset to train the neural network and used for inputs when the trained neural network is applied, to the output images of the neural network after the neural network is applied (e.g., a decrease from seven channels to three channels or a decrease from seven channels to one channel).

Figure 10:
FIG. 10 is a chart 1000 showing an example set of channels at which a multispectral image may be captured, according to embodiments of the present technology.
Figure 11A:
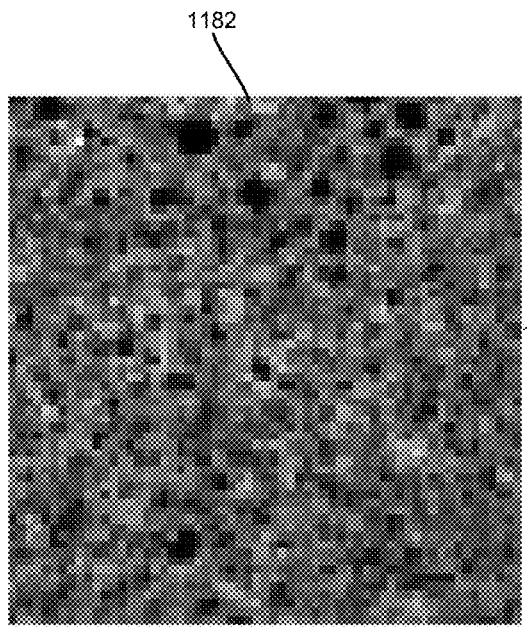
FIGS. 11(a)-(g) show an example set of multispectral images that may be captured on different channels, according to embodiments of the present technology.
Figure 11B:
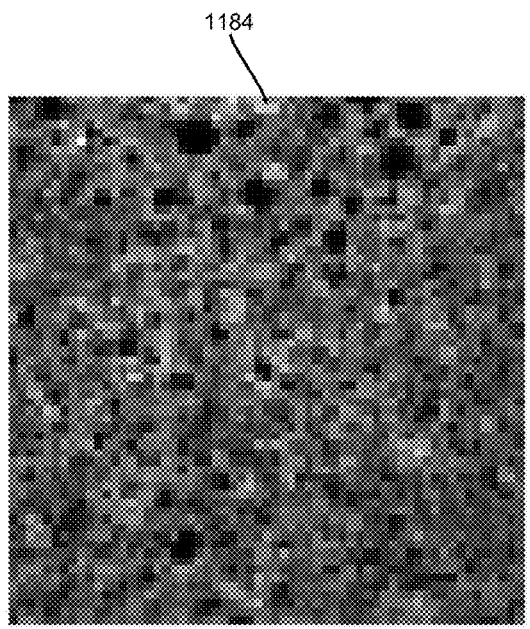
Figure 11C:
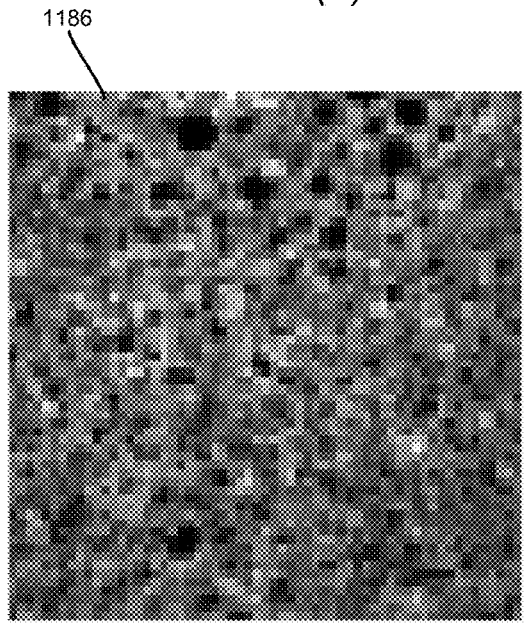
Figure 11D:
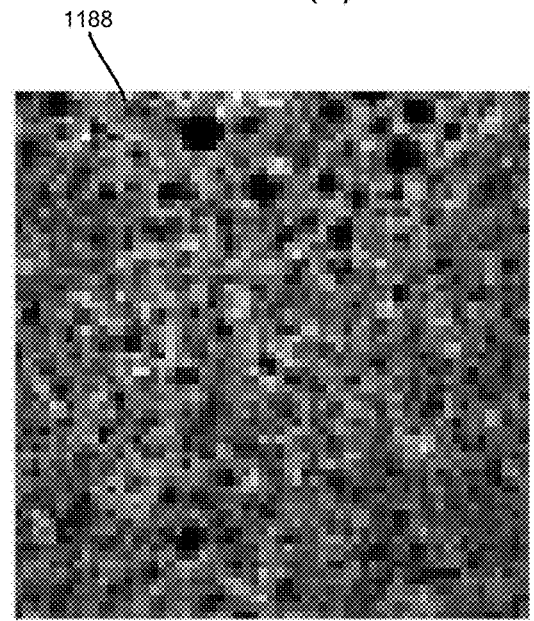
Figure 11E:
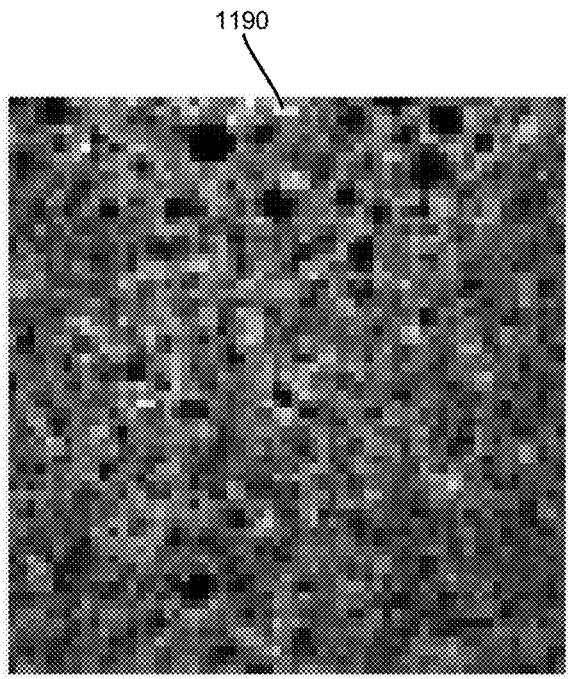
Figure 11F:
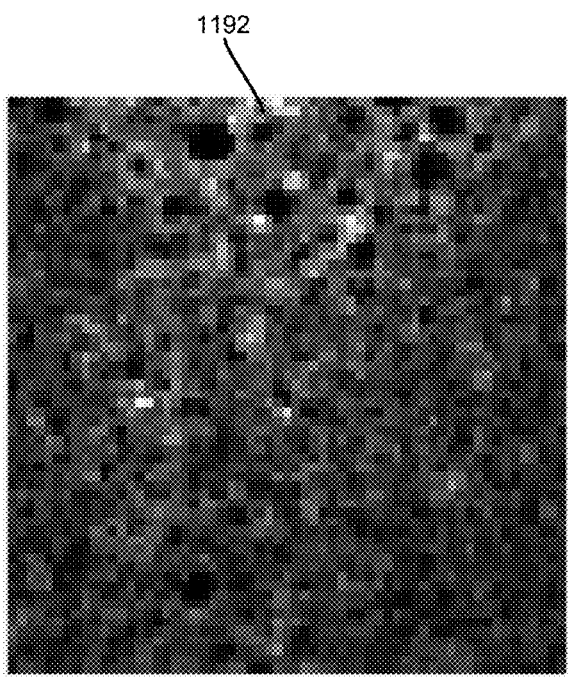
Figure 11G:
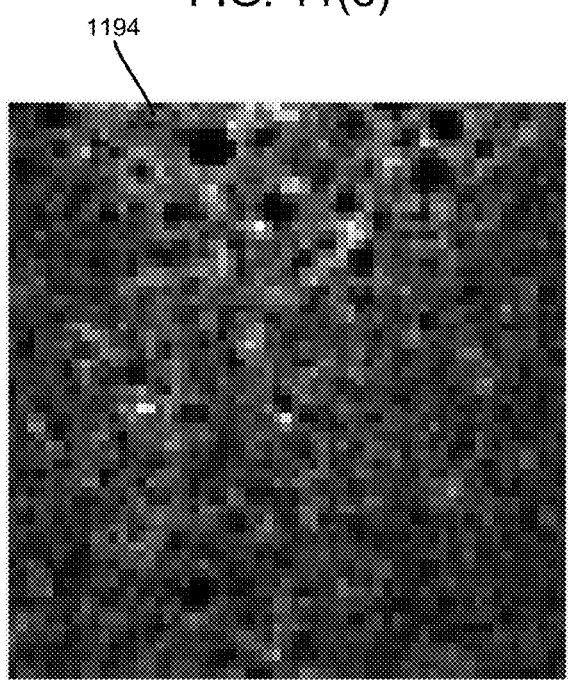

FIG. 10 is a chart 1000 showing an example set of channels at which a multispectral image may be captured, according to embodiments of the present technology. A multispectral image, such as multispectral image 961 in FIG. 9, may be generated via different excitation and/or emission wavelengths. More specifically, each spectral image may be captured at a different channel, each of which includes a different excitation and emission wavelength range. Chart 1000 includes a list of channels 1 through 7. Each channel includes an excitation filter pass band and an emission filter pass band. A multispectral image corresponding to the channels in chart 1000 would include seven spectral images. Since each spectral image of the multispectral image would correspond to a different channel, each spectral image would be captured at an excitation wavelength within the excitation band corresponding to that channel and at an emission wavelength within the emission band corresponding to that channel.

Certain aspects of the channels and corresponding wavelength bands may be strategically chosen based on a variety of factors. The number of spectral images included in the plurality of spectral images may be strategically chosen to maximize the increase of spatial resolution of the input image as caused by the trained neural network. Furthermore, each spectral image of the first plurality of spectral images may include data from a different wavelength band. The wavelength band of each spectral image of the plurality of spectral images may also be strategically chosen to maximize the increase of spatial resolution of the input image as caused by the trained neural network. For example, the number of spectral images in the multispectral image and the specific wavelength bands of each spectral image may be chosen to maximize spatial resolution enhancement while avoiding use of additional, unnecessary spectral images that may cause training of the neural network or application of the neural network to slow down without adding sufficient value in enhanced spatial resolution. In example embodiments, the number of channels and the wavelength bands corresponding to those channels may be chosen to target certain features or characteristics of the subject of the multispectral image.

The channels and wavelength bands may be chosen in a variety of ways. For example, the channels and wavelength bands may be chosen using machine learning. For example, a neural network may be trained to predict which channels and wavelength bands associated with those channels may be used to target certain features in certain types of subjects by using multispectral images of those subject as inputs in training the neural network. For example, if a target feature of a subject is a particular cell structure, then the neural network may be trained to predict, using a training dataset that includes images of the subject that includes cell structure details, which channels and wavelength bands may be best suited to yield images with the most cell structure detail. In another example, if a target feature is high resolution output, then the neural network may be trained to predict, using a training dataset that includes images of the subject that include different channels/wavelengths and data directed to resolution of output images, which channels and wavelength bands may be best suited to yield images with the highest resolution. However, in some embodiments, determining the channels, or number of channels, that yield the highest resolution may not be the only factor contributing to a decision regarding which channels and wavelength bands and how many channels should be used. As noted, avoiding use of additional, unnecessary spectral images that may cause training of the neural network or application of the neural network to slow down without adding sufficient value in enhanced spatial resolution may also be a factor. Therefore, a neural network may be trained to determine how much increase in spatial resolution may be achieved by, for example, adding each additional channel (i.e. adding each additional spectral image to the multispectral image). The neural network may then be applied to an input image to predict an ideal, or optimize, for example, the number of channels and their associated wavelength bands.

While certain features of the inputs may be selected to maximize certain variables, such as spatial resolution, these features may be required to be consistent between the multispectral images included in the training dataset and any inputs to the already trained neural network. For example, if a neural network is trained using multispectral images that include seven spectral channels with certain specific wavelength bands, such as the example set of channels shown in FIG. 10, any input multispectral image that the resulting trained neural network is applied to may also be required to include the same number (seven) of spectral channels and the same (or at least overlapping) wavelength bands associated with each spectral channel. Using a trained neural network to try to predict an output for a multispectral image with differing numbers of spectral channels and/or different wavelength bands may cause the output prediction to be inaccurate.

FIGS. 11(a)-(g) show an example set of multispectral images that may be captured on different channels, according to embodiments of the present technology. As explained with respect to FIG. 10, multispectral images may be generated via different excitation and/or emission wavelengths such that each spectral image may be captured at a different channel, each of which includes a different excitation and emission wavelength range. Multispectral images 1182-1194 in FIGS. 11(a)-11(g) are an example set of images captured at seven different channels, respectively. Multispectral images 1182-1194 may be used as one set of images included in a training dataset used to train an artificial neural network, such as artificial neural network 930 in FIG. 9. Alternatively, multispectral images 1182-1194 may be used as an input to an already trained neural network, such as trained neural network 964 in FIG. 9. Furthermore, multispectral images 1182-1194 may also include various features similar to illustrations 961a-c in FIG. 9. Similar to illustrations 961a-c, multispectral images 1182-1194 may each include different features, or different data associated with some of the same features, that may be used by the neural network to generate a high resolution output. The use of multispectral images 1182-1194 and an example resulting output is described further with respect to FIGS. 12(a)-(d) herein.

Figure 12A:
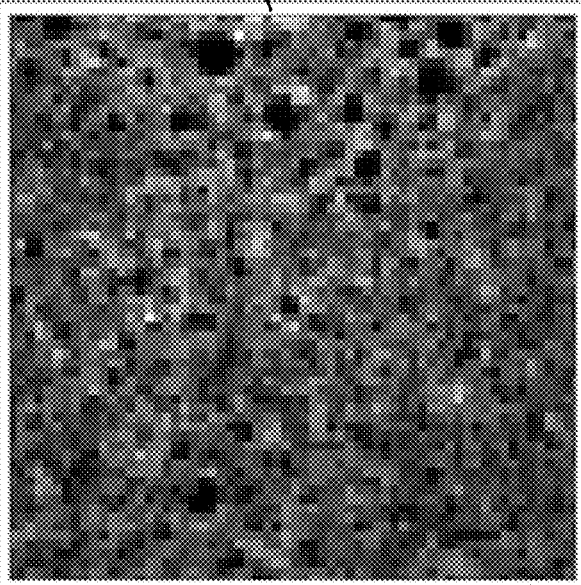
FIG. 12(a) shows an example spectral image from a low-resolution multispectral image of an example tissue sample, according to embodiments of the present technology.
Figure 12B:
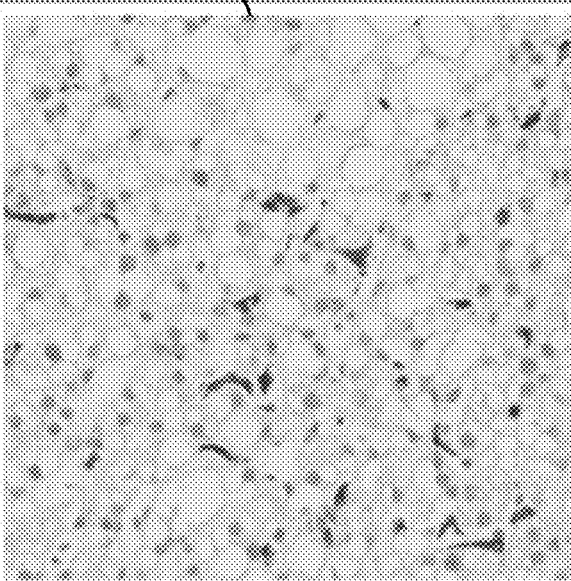
FIG. 12(b) shows an image captured of the same tissue sample as image, but in high resolution, according to embodiments of the present technology.
Figure 12C:
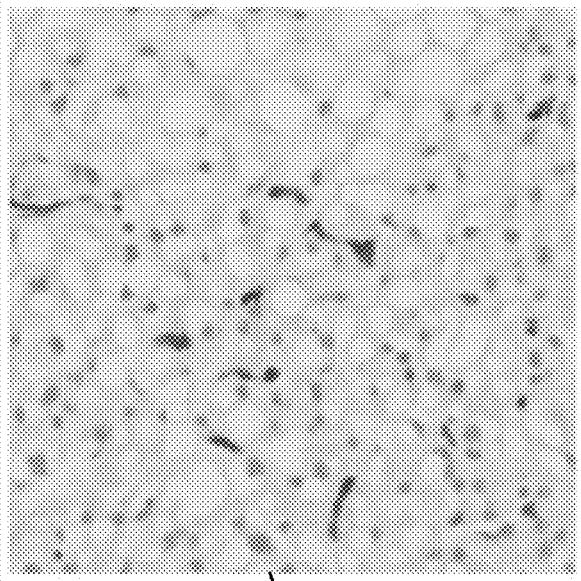
FIG. 12(c) shows a resolution enhanced predicted image, which was generated as an output of a neural network, according to embodiments of the present technology.
Figure 12D:
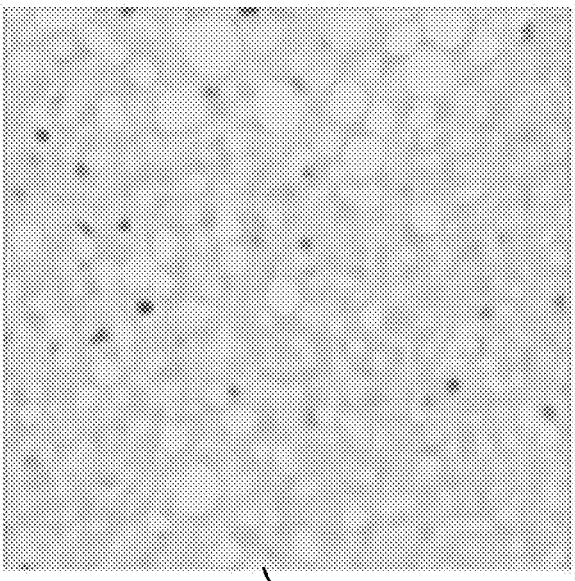
FIG. 12(d) shows a predicted image without resolution enhancement, which was generated as an output of a neural network, according to embodiments of the present technology.

FIGS. 12(a)-(d) show example real and virtual images of a tissue sample, according to embodiments of the present technology. FIG. 12(a) shows an example spectral image 1272 from a low-resolution multispectral image of an example tissue sample. The pixel size of image 1272 is approximately 5 μm. Image 1272 may have been captured using an image capture device at that low resolution, or it may be captured at a high resolution and downsampled after being captured. FIG. 12(b) shows an image 1274 captured of the same tissue sample as image 1272, but in high resolution. Image 1274 was captured directly by using an image capture device, and was not generated by a neural network to predict the image. Due to the quality and high resolution of image 1274, image 1274 is an example target image for an output of a trained neural network as described herein according to embodiments of the present technology. The pixel size of image 1272 is approximately 0.25 μm (an approximately 20 times higher resolution than image 1272). FIG. 12(d) shows a predicted image 1278, which was generated as an output of a neural network. The training dataset used to train the neural network used to generate image 1278 included low resolution monochrome images with a single channel (i.e. one spectral image). Furthermore, the image used as an input to which the trained neural network was applied to generate image 1278 included also a single channel image). FIG. 12(c) shows a predicted image 1276, which was generated as an output of a neural network. However, the training dataset used to train the neural network used to generate image 1276 included low resolution multispectral images with seven channels (i.e. seven spectral images per multispectral image), such as, for example, multispectral images 1182-1194 in FIGS. 11(a)-(g). Furthermore, the image used as an input to which the trained neural network was applied to generate image 1276 included also a multispectral image with seven channels.

As can be seen by comparing image 1276 in FIG. 12(c) with image 1278 in FIG. 12(d), the predicted image 1276 includes much higher resolution as compared to image 1278, and much higher accuracy of a prediction. Furthermore as can be seen by this comparison, image 1276 more closely resembles the high resolution image captured directly, as shown by image 1274 in FIG. 12(b). Comparing images

1276 and 1278 illustrates that using multispectral low resolution image inputs yields more accurate and higher resolution predictions than using monochromatic low resolution image inputs.

Figure 13:
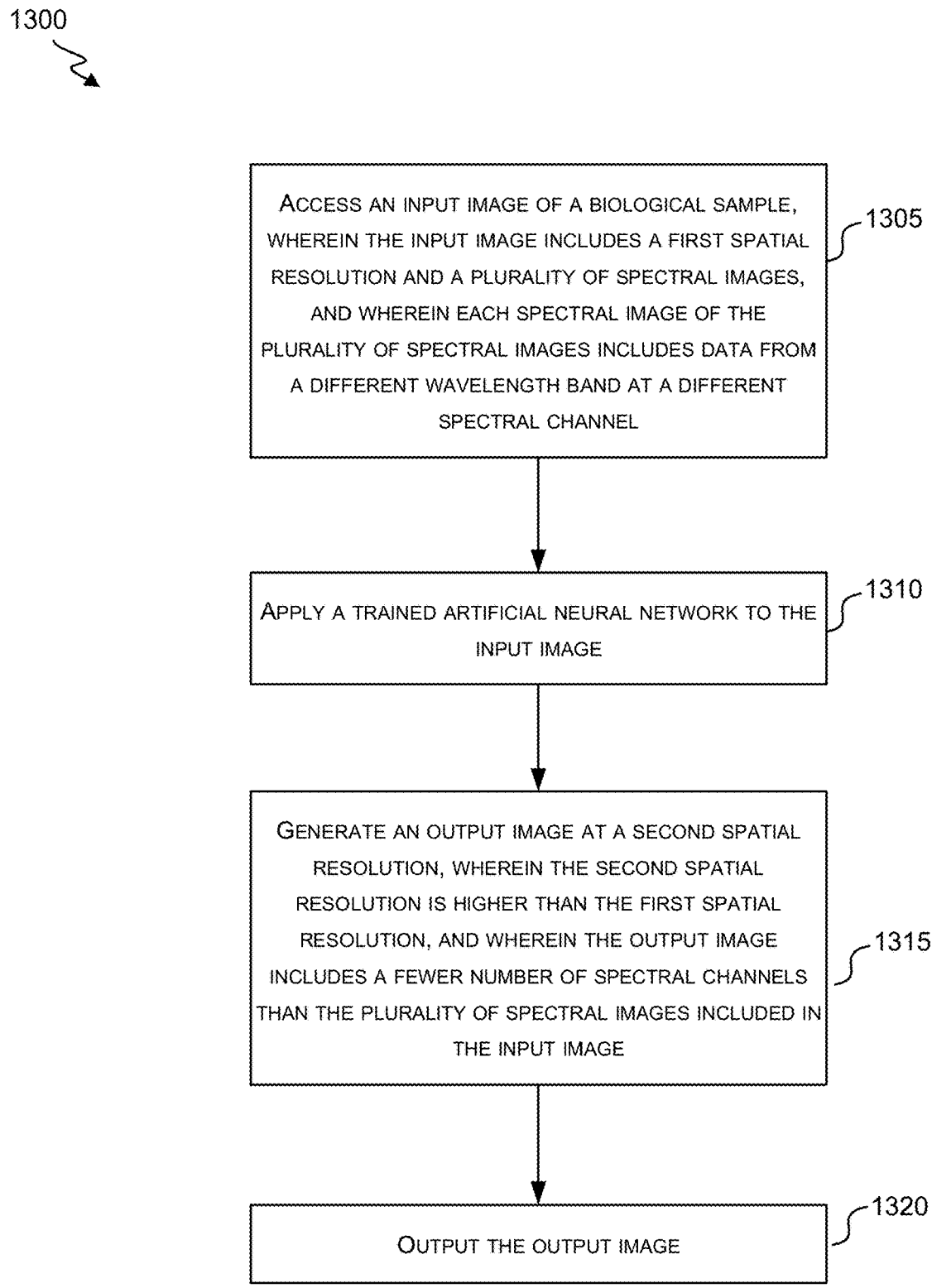
FIG. 13 is a flow chart that includes example method steps of predicting images with enhanced spatial resolution using a trained neural network, according to embodiments of the present technology.

FIG. 13 is a flow chart that includes example method steps of predicting images with enhanced spatial resolution using a trained neural network, according to embodiments of the present technology. Step 1305 includes accessing an input image of, for example, a biological sample. The input image may also include images of subjects other than biological samples. The input image may include a first spatial resolution and a plurality of spectral images, and wherein each spectral image of the plurality of spectral images includes data from a different wavelength band at a different spectral channel. As described herein, the input image may be a multi- or hyper-spectral image that includes multiple spectral images represented by different spectral channels or frequencies. Different, or complementary, data may be collected from each spectral image, contributing to a more accurate predictive output image once the neural network is applied to it.

Step 1310 includes applying a trained artificial neural network to the input image. The neural network may include a convolutional neural network trained according to processes as described according to embodiments of the present technology. Step 1315 includes generating an output image at a second spatial resolution, wherein the second spatial resolution is higher than the first spatial resolution, and wherein the output image includes a fewer number of spectral channels than the plurality of spectral images included in the input image. The output is generated by applying the trained neural network to the multispectral input image. The neural network may use the various different data collected from the different spectral images to generate an accurate prediction output image. The data from the multiple spectral images may be used to give more context to certain features in the subject, predict features that aren't even present in the spectral images, fill in holes within the features, etc. Step 1320 includes outputting the output image once it has been generated by the neural network.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

All ranges disclosed herein are to be understood to encompass any and all subranges subsumed therein. For example; a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10.

Every formulation or combination of components described or exemplified can be used to practice the invention, unless otherwise stated. Specific names of materials are intended to be exemplary, as it is known that one of ordinary skill in the art can name the same material differently. It will be appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method, comprising:
   accessing an image training dataset including a plurality of image pairs, wherein each image pair of the plurality of image pairs includes:
      a first image of a biological sample acquired when the biological sample is unstained, wherein the first image includes a first plurality of spectral images of the biological sample, and wherein each spectral image of the first plurality of spectral images includes data from a different wavelength band; and
      a second image of the biological sample acquired when the biological sample is stained;
   training the artificial neural network using the image training dataset;
   accessing an input image of the biological sample, wherein the input image includes a first spatial resolution and a second plurality of spectral images, and wherein each spectral image of the second plurality of spectral images includes data from a different wavelength band at a different spectral channel;
   applying the trained artificial neural network to the input image;
   generating an output image at a second spatial resolution, and wherein the output image includes a fewer number of spectral channels than the second plurality of spectral images included in the input image; and
   outputting the output image.

2. The computer-implemented method of claim 1, wherein the biological sample is unstained, and wherein the output image includes features of the biological sample after the biological sample is stained.

3. The computer-implemented method of claim 1, further comprising:
   determining a set of desired features associated with the biological sample; and
   determining a specific number of spectral images based on the set of desired features, wherein the plurality of spectral images includes the specific number of spectral images.

4. The computer-implemented method of claim 1, further comprising:
   determining a set of desired features associated with the biological sample; and
   determining a specific number of wavelength bands for each spectral image of the plurality of spectral images based on the set of desired features.

5. The computer-implemented method of claim 1, further comprising:
   determining a range of candidate numbers of spectral images to be included in the second plurality of spectral images;
   determining a difference between the second spatial resolution and the first spatial resolution associated with each of the candidate numbers of spectral images; and
   determining an optimal number of spectral images based on the difference between the second spatial resolution and the first spatial resolution associated with each of the candidate numbers of spectral images.

6. The computer-implemented method of claim 5, wherein the first image of the biological sample is down-sampled before training the artificial neural network using the image training dataset, and wherein the down-sampled first image has a spatial resolution lower than the first spatial resolution.

7. The computer-implemented method of claim 1, further comprising, for each of the plurality of image pairs, spatially registering the first image with the second image such that each pixel in the first image is correlated with a respective pixel in the second image that is located at the same spatial coordinates.

8. The computer-implemented method of claim 1, wherein the artificial neural network is a convolutional neural network.

9. The computer-implemented method of claim 1, wherein the output image is a red-green-blue (RGB) color image.

10. The computer-implemented method of claim 1, wherein the output image is a monochrome image.

11. The computer-implemented method of claim 1, wherein the biological sample is a formalin-fixed paraffin-embedded prostate tissue or liver tissue.

12. A system comprising:
    one or more data processors; and
    a non-transitory computer readable storage medium containing instructions which when executed on the one or more data processors, cause the one or more data processors to perform actions including:
       accessing an image training dataset including a plurality of image pairs, wherein each image pair of the plurality of image pairs includes:
          a first image of a biological sample acquired when the biological sample is unstained, wherein the first image includes a first plurality of spectral images of the biological sample, and wherein each spectral image of the first plurality of spectral images includes data from a different wavelength band; and
          a second image of the biological sample acquired when the biological sample is stained;
       training the artificial neural network using the image training dataset;
       accessing an input image of the biological sample, wherein the input image includes a first spatial resolution and a second plurality of spectral images, and wherein each spectral image of the second plurality of spectral images includes data from a different wavelength band at a different spectral channel;
       applying the trained artificial neural network to the input image;
       generating an output image at a second spatial resolution, and wherein the output image includes a fewer number of spectral channels than the second plurality of spectral images included in the input image; and
       outputting the output image.

13. The system of claim 12, wherein the biological sample is unstained, and wherein the output image includes features of the biological sample after the biological sample is stained.

14. The system of claim 12, wherein the instructions further comprise:
   determining a set of desired features associated with the biological sample; and
   determining a specific number of spectral images based on the set of desired features, wherein the plurality of spectral images includes the specific number of spectral images.

15. The system of claim 12, wherein the instructions further comprise:
   determining a set of desired features associated with the biological sample; and
   determining a specific number of wavelength bands for each spectral image of the plurality of spectral images based on the set of desired features.

16. The system of claim 12, wherein the instructions further comprise:
   determining a range of candidate numbers of spectral images to be included in the second plurality of spectral images;
   determining a difference between the second spatial resolution and the first spatial resolution associated with each of the candidate numbers of spectral images; and
   determining an optimal number of spectral images based on the difference between the second spatial resolution and the first spatial resolution associated with each of the candidate numbers of spectral images.

17. The system of claim 12, wherein the first image of the biological sample is down-sampled before training the artificial neural network using the image training dataset, and wherein the down-sampled first image has a spatial resolution lower than the first spatial resolution.

18. The system of claim 12, wherein the instructions further comprise, for each of the plurality of image pairs, spatially registering the first image with the second image such that each pixel in the first image is correlated with a respective pixel in the second image that is located at the same spatial coordinates.

\* \* \* \* \*